(12) United States Patent
Kim et al.

(10) Patent No.: US 11,398,107 B2
(45) Date of Patent: Jul. 26, 2022

(54) FINGERPRINT-TOUCH COMBINED SENSOR AND ELECTRONIC DEVICE INCLUDING THE SAME

(71) Applicant: SAMSUNG ELECTRONICS CO., LTD., Suwon-si (KR)

(72) Inventors: Hyunjoon Kim, Seoul (KR); Jinmyoung Kim, Hwaseong-s (KR); Seogwoo Hong, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/133,175

(22) Filed: Dec. 23, 2020

(65) Prior Publication Data

US 2021/0256237 A1    Aug. 19, 2021

(30) Foreign Application Priority Data

Feb. 13, 2020    (KR) .................. 10-2020-0017915

(51) Int. Cl.
*G06F 3/044* (2006.01)
*G06F 3/047* (2006.01)
(Continued)

(52) U.S. Cl.
CPC .......... *G06V 40/1306* (2022.01); *G06F 3/047* (2013.01); *G06F 3/0412* (2013.01);
(Continued)

(58) Field of Classification Search
CPC ......... G06K 9/0002; G06F 2203/04112; G06F 2203/04111; G06F 21/32; G06F 3/047;
(Continued)

(56) References Cited

U.S. PATENT DOCUMENTS 9,281,347 B2    3/2016    Choi et al.
10,176,358 B2   1/2019    Han et al.
(Continued)

FOREIGN PATENT DOCUMENTS

KR           10-1474733 B1    12/2014
KR      10-2016-0141180 A    12/2016
(Continued)

OTHER PUBLICATIONS

Ma et al., "On-Display Transparent Half-Diamond Pattern Capacitive Fingerprint Sensor Compatible With AMOLED Display," IEEE Sensors Journal, vol. 16, No. 22, pp. 8124-8131, Nov. 15, 2016.

*Primary Examiner* — Mihir K Rayan
(74) *Attorney, Agent, or Firm* — Sughrue Mion, PLLC

(57) ABSTRACT

A sensor for recognizing a fingerprint and sensing a touch is provided. The sensor includes a touch sensing area in which a first touch electrode and a second touch electrode are arranged to provide touch sensing nodes at which touch sensing is performed; and a fingerprint-touch sensing area comprising a fingerprint recognition area in which a first fingerprint electrode and a second fingerprint electrode are arranged and electrically separated from the first touch electrode and the second touch electrode, the first fingerprint electrode and the second fingerprint electrode being configured to provide fingerprint sensing nodes at which a fingerprint is recognized in a fingerprint recognition mode, wherein in the fingerprint recognition area, a portion of the first fingerprint electrode and the second fingerprint electrode is used for fingerprint recognition and, as the touch sensing nodes, the touch sensing.

19 Claims, 12 Drawing Sheets

(51) Int. Cl.
*G06F 3/041* (2006.01)
*G06V 40/13* (2022.01)

(52) U.S. Cl.
CPC .......... *G06F 3/0446* (2019.05); *G06F 3/0448* (2019.05); *G06F 2203/04112* (2013.01)

(58) Field of Classification Search
CPC .... G06F 3/0448; G06F 3/0446; G06F 3/0445; G06F 3/0443; G06F 3/0418; G06F 3/0416; G06F 3/0412
See application file for complete search history.

(56) References Cited

U.S. PATENT DOCUMENTS

| | | | |
|---|---|---|---|
| 10,338,731 B2 * | 7/2019 | Song | G06F 3/0446 |
| 10,627,955 B2 * | 4/2020 | Ko | G06F 3/0446 |
| 2012/0105081 A1 * | 5/2012 | Shaikh | G06F 3/0445 29/829 |
| 2015/0135108 A1 | 5/2015 | Pope et al. | |
| 2016/0350570 A1 * | 12/2016 | Han | G06F 3/041661 |
| 2016/0350571 A1 * | 12/2016 | Han | G06F 3/04164 |
| 2016/0364593 A1 * | 12/2016 | Lee | G06F 3/0446 |
| 2017/0308228 A1 | 10/2017 | Benkley, III et al. | |
| 2017/0336909 A1 * | 11/2017 | Song | G06K 9/0002 |
| 2018/0039349 A1 * | 2/2018 | Han | G06V 40/1365 |
| 2019/0042018 A1 | 2/2019 | Kim | |
| 2020/0050815 A1 | 2/2020 | Hong et al. | |

FOREIGN PATENT DOCUMENTS

| | | |
|---|---|---|
| KR | 10-2016-0141259 A | 12/2016 |
| KR | 10-2017-0131786 A | 11/2017 |
| KR | 10-2019-0007140 A | 1/2019 |
| WO | 2017/142161 A1 | 8/2017 |

* cited by examiner

FIRST DIAGONAL DIRECTION
SECOND DIAGONAL DIRECTION

FIRST DIAGONAL DIRECTION
SECOND DIAGONAL DIRECTION

FINGERPRINT-TOUCH COMBINED SENSOR AND ELECTRONIC DEVICE INCLUDING THE SAME

CROSS-REFERENCE TO RELATED APPLICATION

This application claims priority to Korean Patent Application No. 10-2020-0017915, filed on Feb. 13, 2020, in the Korean Intellectual Property Office, the disclosure of which is herein incorporated by reference in its entirety.

BACKGROUND

1. Field

Example embodiments of the present disclosure relate to a fingerprint and touch sensor and an electronic device including the same.

2. Description of Related Art

A touch screen is an input device that, when a user touches or presses a screen with a finger or the like, recognizes a location or related information of a touch input and transmits a recognition result to a system. The touch screen has an advantage of being simple and convenient to use. In particular, a capacitive touch screen has advantages of high light transmittance and excellent durability, excellent touch resolution, and multi-touch capability. A touch screen panel is applied to a wide variety of electronic devices such as automatic teller machines (ATMs), automatic ticket machines, and navigation devices in addition to mobile devices such as smart phones, foldable phones, and tablet personal computers (PCs).

Recently, there is an increasing need for personal authentication for various mobile devices and electronic devices. The personal authentication may be performed by using individual characteristics such as a fingerprint, a voice, a face, and an iris in mobile devices, access control devices, financial devices, and the like.

The fingerprint recognition technology used in smart phones, tablet PCs, etc. according to the related art methods is based on a structure configured such that a fingerprint recognition module is separate from a touch screen module. Recently, fingerprint sensors that are manufactured using capacitive methods are applied to home buttons of the smart phones and the like. As screens of mobile devices have been enlarged, bezels have been minimized and the home button has been removed. Accordingly, technology capable of performing fingerprint recognition on a screen has been developed.

SUMMARY

Example embodiments provide a fingerprint and touch sensor capable of performing both fingerprint recognition and touch sensing at a fingerprint recognition position and securing a driving frequency for fingerprint sensing without losing the linearity of touch sensing in a touch sensing mode and an electronic device including the same.

Additional aspects will be set forth in part in the description which follows and, in part, will be apparent from the description, or may be learned by practice of the presented embodiments of the disclosure.

According to an aspect of an example embodiment, there is provided a sensor for recognizing a fingerprint and sensing a touch, the sensor including: a touch sensing area in which a first touch electrode and a second touch electrode are arranged to provide touch sensing nodes at which touch sensing is performed; and a fingerprint-touch sensing area including a fingerprint recognition area in which a first fingerprint electrode and a second fingerprint electrode are arranged and electrically separated from the first touch electrode and the second touch electrode, the first fingerprint electrode and the second fingerprint electrode being configured to provide fingerprint sensing nodes at which a fingerprint is recognized in a fingerprint recognition mode, wherein in the fingerprint recognition area, a portion of the first fingerprint electrode and the second fingerprint electrode is used for fingerprint recognition and, as the touch sensing nodes, the touch sensing.

The fingerprint-touch sensing area may further include a wiring area in which the first fingerprint electrode and the second fingerprint electrode extend from the fingerprint-touch sensing area, the first fingerprint electrode and the second fingerprint electrode being configured to form the touch sensing nodes.

An interval between the touch sensing nodes in the fingerprint recognition area and the wiring area may be greater than an interval between the fingerprint sensing nodes in the fingerprint recognition area.

The interval between the touch sensing nodes may be constant in the touch sensing area, the fingerprint recognition area, and the wiring area.

An interval between the touch sensing nodes in the fingerprint recognition area may be greater than an interval between the fingerprint sensing nodes in the fingerprint recognition area.

An interval between the touch sensing nodes may be constant in the touch sensing area and the fingerprint recognition area.

The first touch electrode may include a plurality of first touch electrodes arranged in parallel in a first direction, and the second touch electrode may include a plurality of second touch electrodes arranged in a parallel in a second direction, the second touch electrode intersecting the first touch electrode.

Each of the first touch electrode and the second touch electrode may include a plurality of polygonal pattern parts and at least one connection part between the plurality of polygonal pattern parts, or at least one of the first touch electrode or the second touch electrode may include an electrode line.

At least one of the first touch electrode or the second touch electrode may include a plurality of polygonal pattern parts and at least one connection part between the plurality of polygonal pattern parts, and at least a portion of the plurality of polygonal pattern parts may have a structure in which a metal mesh is formed.

At least a portion of the first touch electrode and at least a portion of the second touch electrode may be located at different levels, and an insulating layer may be formed between the at least a portion of the first touch electrode and the at least a portion of the second touch electrode, or the first and second touch electrodes are located at the same level, and are located at different levels at an intersection, and an insulating layer is formed therebetween.

According to an aspect of an example embodiment, there is provided an electronic device including: a display panel; and a sensor for recognizing a fingerprint and a touch integrated on the display panel, the sensor including: a touch sensing area in which a first touch electrode and a second touch electrode are arranged to provide touch sensing nodes at which touch sensing is performed; and a fingerprint-touch sensing area including a fingerprint recognition area in which a first fingerprint electrode and a second fingerprint electrode are arranged and electrically separated from the first touch electrode and the second touch electrode, the first fingerprint electrode and the second fingerprint electrode being configured to provide fingerprint sensing nodes at which a fingerprint is recognized in a fingerprint recognition mode, wherein in the fingerprint recognition area, a portion of the first fingerprint electrode and the second fingerprint electrode is used for fingerprint recognition and, as the touch sensing nodes, the touch sensing.

The electronic device may include any one or more of a smart phone, a foldable phone, a tablet personal computer (PC), and a touch screen device.

The sensor may be disposed on the display panel.

The fingerprint-touch sensing area may be located on a side portion of the display panel.

The fingerprint-touch sensing area may be located in a middle of the side portion of the display panel.

The fingerprint-touch sensing area may be provided on a lower side portion of the display panel, and the fingerprint recognition area may be spaced apart from an outer edge of the display panel.

The fingerprint-touch sensing area may have a triangular shape, and the fingerprint recognition area may have a rhombus shape on an upper portion the fingerprint-touch sensing area.

The fingerprint-touch sensing area may be located in a corner portion of the display panel.

The fingerprint recognition area may be spaced apart from an outer edge of the display panel.

At least one of the first touch electrode or the second touch electrode may include a plurality of polygonal pattern parts and at least one connection part between the plurality of polygonal pattern parts; at least a portion of the plurality of polygonal pattern parts may have a structure in which a metal mesh is formed; and the metal mesh may be formed to correspond to a boundary between sub-pixels of the display panel, and openings of the metal mesh correspond to light emission areas of the sub-pixels.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
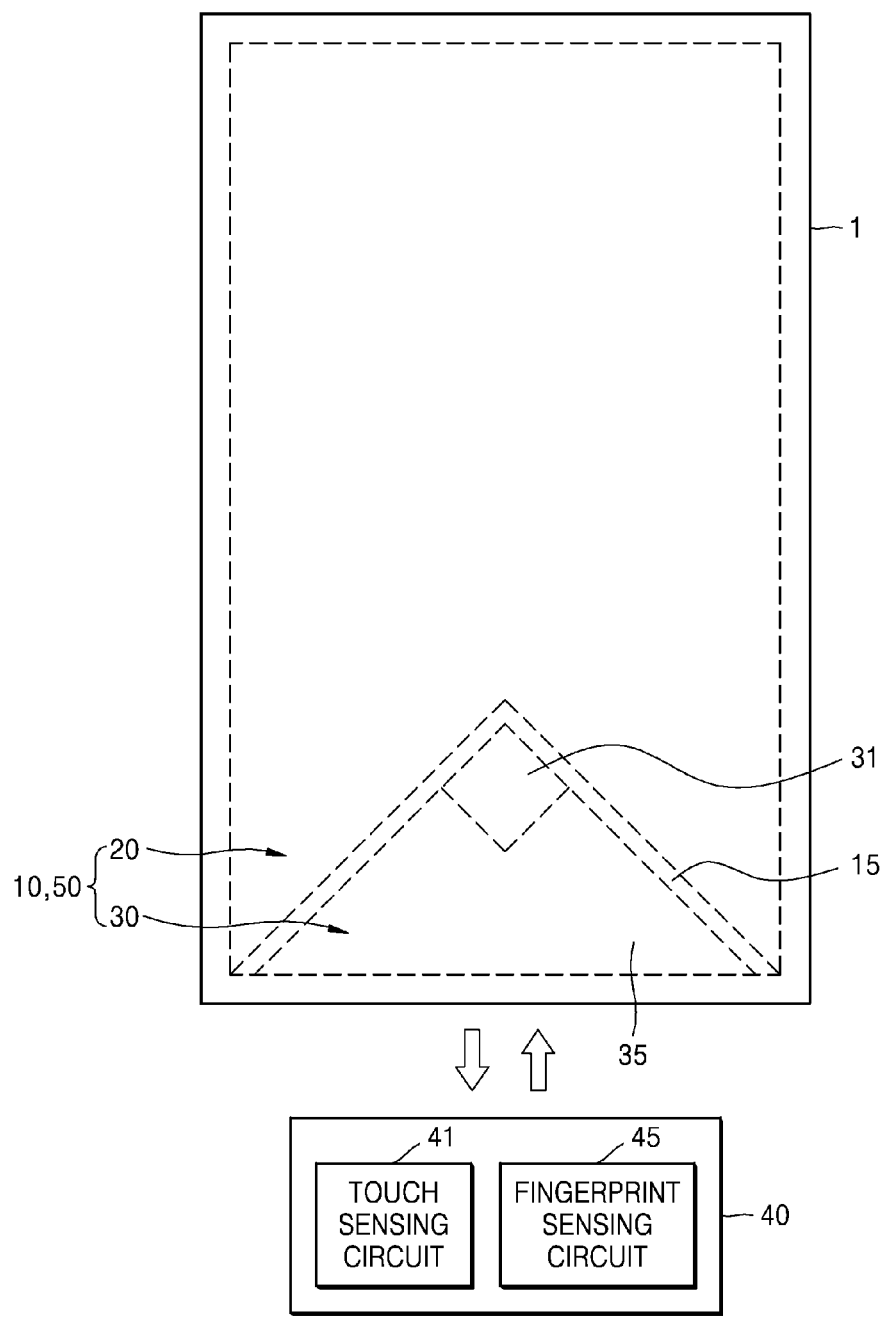
FIG. 1 is a plan view schematically showing a touch screen of an electronic device to which a fingerprint and touch sensor according to an example embodiment is applied.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects of the disclosure. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described in detail with reference to the accompanying drawings. In the drawings below, like reference numerals refer to like elements, and the size of each component in the drawings may be exaggerated for clarity and convenience of description. The embodiments described below are merely examples, and various modifications are possible from the example embodiments.

Hereinafter, what is described as "upper" or "on" may include not only directly over in contact but also over not in contact. Terms such as "first" and "second" may be used to describe various components, but are used only for the purpose of distinguishing one component from other components. These terms do not limit the materials or structures of the components. The terms of a singular form may include plural forms unless otherwise specified. Also, when a part "includes" a component, this means that, unless specifically stated otherwise, it may further include other components rather than excluding other components. The use of the term "above" and similar indication terms may correspond to both singular and plural.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In a mobile device, as a screen is enlarged, a bezel is minimized, and a home button is not provided. Therefore, a sensor capable of fingerprint recognition on a display screen which is a touch screen is needed. In order to recognize a touch input while recognizing a fingerprint using a capacitive fingerprint sensor on a display screen, a sensor structure in which a touch sensor and a fingerprint sensor are integrated is provided according to the disclosure.

The fingerprint and touch sensor according to an example embodiment may be applied to sense a user's touch and fingerprint on a touch screen (e.g., a display screen) of an electronic device, in an electrostatic manner. For example, a fingerprint and touch sensor according to an example embodiment may be applied to sense a user's touch and fingerprint on a touch screen in various mobile devices, various types of touch screen devices, and the like in addition to smartphones, foldable phones, tablet PCs equipped with a touch screen as the display screen. A fingerprint and touch sensor according to an example embodiment may be provided such that a capacitive fingerprint and touch sensor is efficiently driven on a display screen (i.e., touch screen) of an electronic device (e.g., a smartphone or a larger screen device), and touch sensing may be efficiently performed in all areas of the display screen.

In order to avoid display noise, a touch sensor needs to be driven at about 200 MHz or higher and a fingerprint sensor needs to be driven at about 1 MHz or higher to secure a fingerprint image. In the case where the display screen is a touch screen, when the display screen area is increased, a resistance of an electrode is also increased, and thus, a sensing sensitivity of the touch sensor may be deteriorated. In the case of the fingerprint sensor, when a distance to a wiring is increased, an overall resistance of the electrode becomes large, and it may be difficult to secure an appropriate driving frequency (~1 MHz).

According to the fingerprint and touch sensor according to an example embodiment, a touch sensing area in which sensing of a touch only is performed and a fingerprint-touch sensing area in which sensing of both a fingerprint and a touch is performed are electrically separated from each other. Accordingly, the resistance and parasitic capacitance in each area may be reduced, and a resistor-capacitor (RC) constant may be reduced, so that driving at a frequency suitable for each sensing area is possible. Therefore, smooth driving of touch and fingerprint sensing is possible. In the fingerprint and touch sensor according to an example embodiment, the fingerprint-touch sensing area may include a fingerprint recognition area in which fingerprint-touch simultaneous sensing is performed, and a wiring area in which wiring of a touch electrode is formed and only the touch sensing is performed. The fingerprint recognition area is provided to be located on the touch screen and a location thereof is not limited. For example, the fingerprint recognition area is located adjacent to (e.g., slightly inside from) an outer boundary of the display screen, to provide user convenience. According to the fingerprint and touch sensor according to an example embodiment, since touch sensing is performed in an entire area of the touch screen, a touch sensing node in the fingerprint-touch sensing area is arranged to be connected at the same period as the touch sensing node in the touch sensing area where touch only sensing is performed so that in a touch sensing mode, linearity of touch sensing may be secured.

Figure 2:
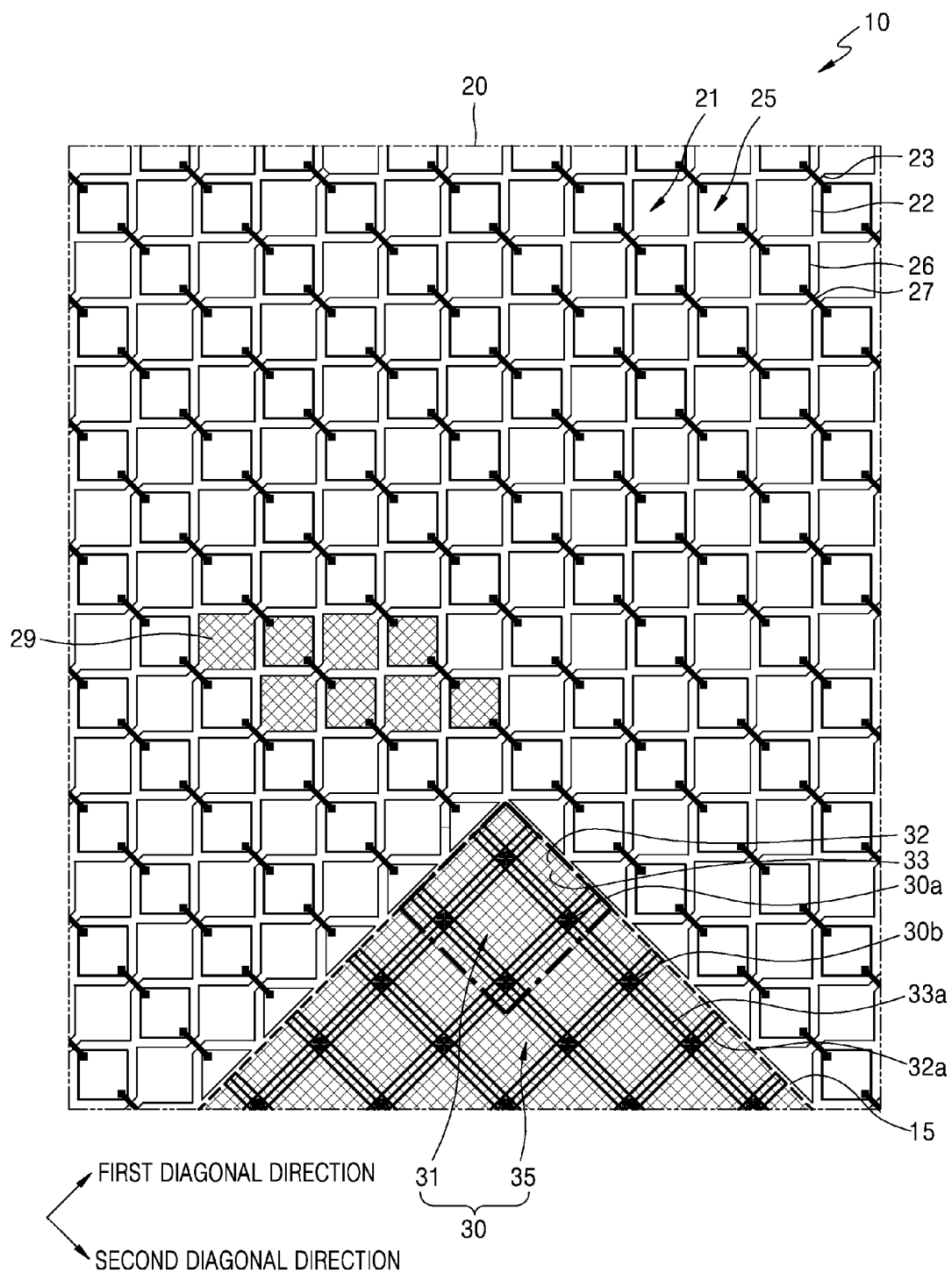
FIG. 2 schematically shows a fingerprint and touch sensor according to an example embodiment.

FIG. 1 is a plan view schematically showing a touch screen 1 of an electronic device to which a fingerprint and touch sensor 10 is applied according to an example embodiment. FIG. 2 schematically shows a fingerprint and touch sensor 10 according to an example embodiment. In FIG. 1, FIG. 2, and the following description, the touch screen 1 may be an image display screen of an electronic device, or a separate screen used for controlling an electronic device through touch and fingerprint recognition.

Referring to FIG. 1, the electronic device includes a fingerprint and touch sensor 10 on a touch screen (or a touch screen panel) 1 and a touch-fingerprint sensing circuit 40 for recognizing a user's touch and/or fingerprint on the touch screen 1. The touch-fingerprint sensing circuit 40 may include a touch sensing circuit 41 for recognizing the presence or absence of a user's touch or a touch position (coordinate) from a signal obtained from the fingerprint and touch sensor 10, and a fingerprint sensing circuit 45 for recognizing a user's fingerprint.

The electronic device may include various devices such as various mobile devices and various types of touch screen devices in addition to smartphones, foldable phones, and tablet PCs equipped with the fingerprint and touch sensor 10 on the touch screen 1.

Referring to FIGS. 1 and 2, the fingerprint and touch sensor 10 is applied to the touch screen 1 of the electronic device to sense a user's touch and fingerprint, and may include a touch sensing area 20 where only touch sensing is possible, and a fingerprint-touch sensing area 30. The fingerprint-touch sensing area 30 may include a fingerprint recognition area 31 in which fingerprint sensing and touch sensing are performed, and a wiring area 35 in which only touch sensing is performed.

Referring to FIG. 2, in the touch sensing area 20, first and second touch electrodes 21 and 25 may be disposed for touch sensing. One of the first and second touch electrodes 21 and 25 may be a driving touch electrode to which a driving signal for touch sensing is applied, and the other may be a sensing touch electrode to obtain a touch sensing signal when a touch occurs.

First and second fingerprint electrodes 32 and 33 may be disposed in the fingerprint recognition area 31 of the fingerprint-touch sensing area 30 to perform fingerprint sensing and touch sensing. In the wiring area 35 of the fingerprint-touch sensing area 30, the first and second fingerprint electrodes 32 and 33 may be extended for wiring and may be arranged to perform touch sensing. One of the first and second fingerprint electrodes 32 and 33 may be a driving fingerprint electrode to which a driving signal for fingerprint recognition is applied, and the other may be a sensing fingerprint electrode for obtaining a fingerprint sensing signal in a fingerprint recognition mode. Here, in the touch recognition mode, a portion of the driving fingerprint electrodes among the first and second fingerprint electrodes 32 and 33 may be used as driving touch electrodes to which a driving signal for touch sensing is applied, and a portion of the sensing fingerprint electrodes among the first and second fingerprint electrodes 32 and 33 may be used as touch sensing electrodes for obtaining a touch sensing signal when a touch occurs.

Here, the touch sensing area 20, the fingerprint recognition area 31 and the wiring area 35 are located in the touch screen 1, and the touch screen 1 may correspond to a display screen of an electronic device to which the fingerprint and touch sensor 10 according to an example embodiment is applied for touch and fingerprint recognition. In the electronic device to which the fingerprint and touch sensor 10 according to an example embodiment is applied, touch sensing and fingerprint sensing may be performed on a display screen. As another example, when the electronic device to which the fingerprint and touch sensor 10 according to an example embodiment is applied has a structure such that a separate touch screen 1 is provided for control through touch and fingerprint recognition, the touch sensing area 20, the fingerprint recognition area 31, and the wiring area 35 may be located in the separate touch screen 1 of the electronic device for touch and fingerprint recognition.

In the touch sensing area 20, the first and second touch electrodes 21 and 25 may be arranged to form an array of touch sensing nodes. In the fingerprint-touch sensing area 30, the first and second fingerprint electrodes 32 and 33 may be disposed to be electrically separated from the first and second touch electrodes 21 and 25 of the touch sensing area 20. The touch sensing area 20 and the fingerprint-touch sensing area 30 may be electrically separated from each other. The touch sensing area 20 and the fingerprint-touch sensing area 30 may be formed to have a boundary area 15 therebetween, and may be substantially spatially separated. In the boundary area 15 corresponding to the boundary between the touch sensing area 20 and the fingerprint-touch sensing area 30, a first wiring for touch sensing of the touch sensing area 20 and a second wiring for fingerprint and touch sensing of the fingerprint-touch sensing area 30 may be disposed. Even in this case, since there is no direct electrical connection between the first and second wirings, the touch sensing area 20 and the fingerprint-touch sensing area 30 may be electrically separated from each other.

Referring to FIG. 2, the first touch electrode 21 may include a plurality of first touch electrodes 21 extending in a first direction, for example, in a first diagonal direction of the touch screen 1, and arranged side by side in a second direction, for example, in a second diagonal direction of the touch screen 1. The second touch electrode 25 may include a plurality of second touch electrodes 25 extending in the second direction, for example, the second diagonal direction to intersect the first touch electrode 21, and arranged in parallel in the first direction, for example, the first diagonal direction. It is possible to provide a structure in which the first and second touch electrodes 21 and 25 are located on different layers and an insulating layer is formed therebetween, or the first and second touch electrodes 21 and 25 are located at the same level, the first and second touch electrodes 21 and 25 are located at different levels only at the intersections, and an insulating layer is formed therebetween.

Moreover, at least one of the first touch electrode 21 and the second touch electrode 25 may include a plurality of polygonal pattern parts and a connection part therebetween. For example, each of the first touch electrodes 21 may include a plurality of polygonal pattern parts 22 arranged in the first diagonal direction and a connection part 23 therebetween, as shown in FIG. 2. For example, each of the second touch electrodes 25 may include a plurality of polygonal pattern parts 26 arranged in the second diagonal direction and a connection part 27 therebetween, as shown in FIG. 2. The polygonal pattern parts 22 and 26 may have, for example, a rhombus shape. FIGS. 1 and 2 show cases where the polygonal pattern parts 22 and 26 have a rhombus shape, which are merely examples, and the shape of the polygonal pattern parts 22 and 26 may have various shapes such as quadrangles of different shapes, triangles, pentagons or hexagons.

Further, the polygonal pattern parts 22 and 26 may have a structure in which, for example, a metal mesh 29 is formed. In FIG. 2, the metal mesh 29 is shown only in a portion of the polygonal pattern parts 22 and 26 of the first touch electrode 21 and the second touch electrode 25, and this is for the convenience of the illustration, and each of the polygonal pattern parts 22 and 26 of the first and second touch electrodes 21 and 25 may have a structure in which the metal mesh 29 is formed. As another example, only a portion of the polygonal pattern parts 22 and 26 forming the first and second touch electrodes 21 and 25 may have a structure in which the metal mesh 29 is formed.

Figure 3:
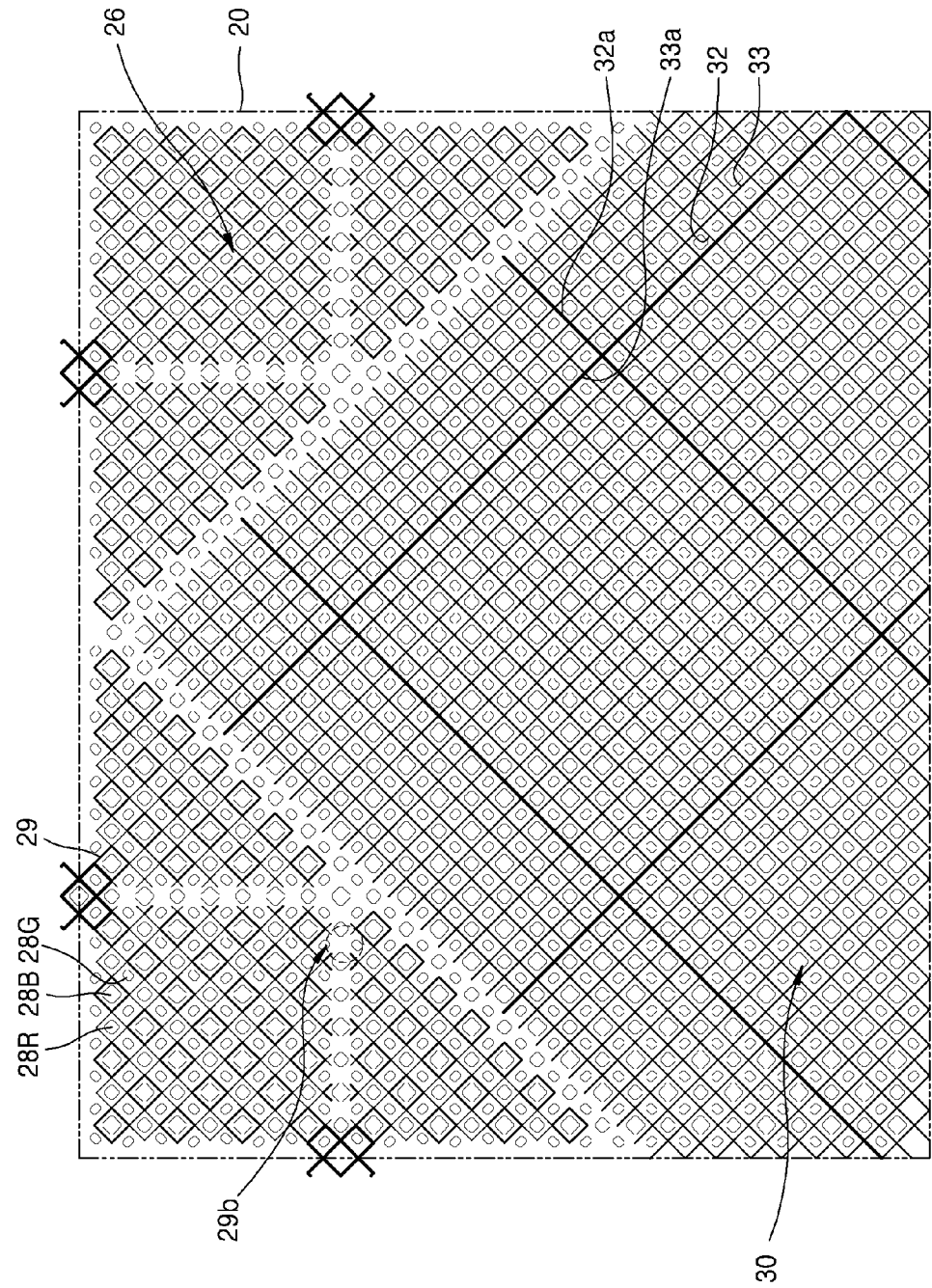
FIG. 3 is an enlarged partial view of FIG. 2.

The metal mesh 29 is patterned to correspond to the boundary between sub-pixels 28R, 28G, and 28B of the touch screen 1 as shown in FIG. 3 so that an opening of the metal mesh 29 may be formed to correspond to a light emission area of the sub-pixels 28R, 28G, and 28B of the display screen 1.

Figure 4:
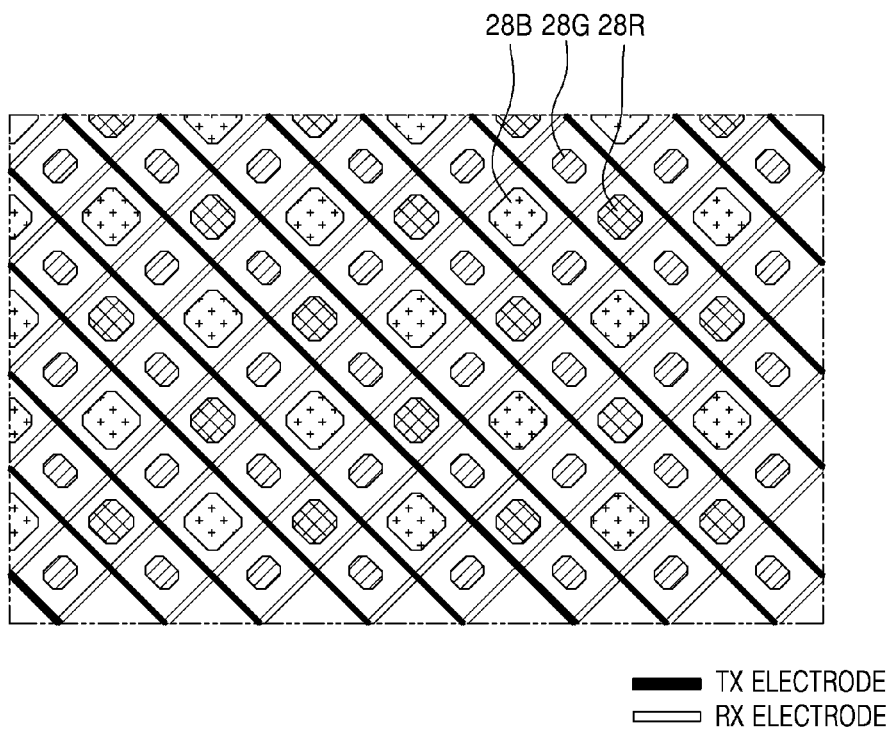
FIG. 4 schematically shows an example of a pixel plane structure of a touch screen according to an example embodiment.

For example, the sub-pixels 28R, 28G, and 28B of the touch screen 1 may be arranged in a diamond PenTile pixel structure, as shown in FIG. 4. FIG. 4 schematically shows a pixel plane structure of a diamond PenTile type organic light-emitting diode (OLED) display and a linear electrode structure (e.g., TX electrode and RX electrode) disposed on a non-light emission area thereof. In FIG. 4, 28R may represent a red sub-pixel, 28G may represent a green sub-pixel, and 28B may represent a blue sub-pixel. Here, the sub-pixels 28R, 28G, and 28B of the touch screen 1 may have an arrangement of cyan (C), yellow (Y), and magenta (M) sub-pixels.

As shown in FIG. 4, when the sub-pixels 28R, 28G, and 28B are arranged in a diamond PenTile pixel structure, in the fingerprint and touch sensor 10 according to an example embodiment, the metal mesh 29 formed on the polygonal pattern parts 22 and 26 of at least one of the first and second touch electrodes 21 and 25 may be formed to correspond to a non-light emission area on the boundary of the sub-pixels 28R, 28G, and 28B of a diamond PenTile pixel structure.

For example, in the case of a structure having the fingerprint and touch sensor 10 on an OLED display pixel, the metal mesh 29 may be formed to be positioned on a non-light emission area between sub-pixels of the OLED. In addition, in the case of a structure having the fingerprint and touch sensor 10 on an LCD pixel, the metal mesh 29 may be disposed on a black matrix area of a color filter.

That is, when the sub-pixels 28R, 28G, and 28B of the touch screen 1 are arranged in a diamond PenTile pixel structure as in FIG. 4, the metal mesh 29 may be patterned to correspond to a boundary between the sub-pixels 28R, 28G, and 28B of the touch screen 1 as shown in FIG. 3. FIGS. 2 and 3 show an example embodiment of the fingerprint and touch sensor 10 that may be applied when the sub-pixel of the touch screen 1 has a diamond PenTile pixel structure arrangement, but embodiments are not limited thereto. Various embodiments of the fingerprint and touch sensor 10 corresponding to various arrangements of sub-pixels are possible, and the metal mesh 29 may be formed on the polygonal pattern parts 22 and 26 of the first touch electrode 21 and the second touch electrode 25 to correspond to the various sub-pixel arrangements.

Referring to FIG. 3 again, the metal mesh 29 may be formed on the polygonal pattern parts 22 and 26 of the first and second touch electrodes 21 and 25, and in this case, the polygonal pattern parts 22 and 26 may have at least two openings. Each of the openings present in each of the polygonal pattern parts 22 and 26 may correspond to one or more sub-pixel light emission areas (in the case of OLED, light emission areas). That is, the plurality of openings may be a path through which light emitted from a plurality of sub-pixels disposed below passes. The metal mesh 29 may be disposed on a non-light emission area between sub-pixel light emission areas. Here, the metal mesh 29 formed on each of the polygonal pattern parts 22 and 26 may be formed as a part of a broken structure, and a broken metal mesh 29b may be electrically floated. As the metal mesh 29 is formed partially broken, for each of the polygonal pattern parts 22 and 26, the size of the capacitance may be adjusted to improve the touch sensitivity. Here, the metal mesh 29 may be formed without being broken. FIG. 3 shows an example of a case where a part of the metal mesh 29 is partially broken.

In this way, when at least one of the first touch electrode 21 and the second touch electrode 25 is formed to include a plurality of polygonal pattern parts 22 and 26 and connection parts 23 and 27 therebetween and the polygonal pattern parts 22 and 26 are formed with a structure in which the metal mesh 29 is formed to correspond to the boundary between sub-pixels, it is possible to sufficiently lower the resistance in the touch sensing area 20 while ensuring light transmittance, so that resistance and parasitic capacitance in the touch sensing area 20 may be reduced, that is, it is possible to reduce the RC constant. Accordingly, a driving speed of 200 kHz or more sufficient for touch sensing, for example, a driving speed of approximately 300 kHz or more, may be achieved, so that a smooth operation of the touch sensor becomes possible.

Figure 5:
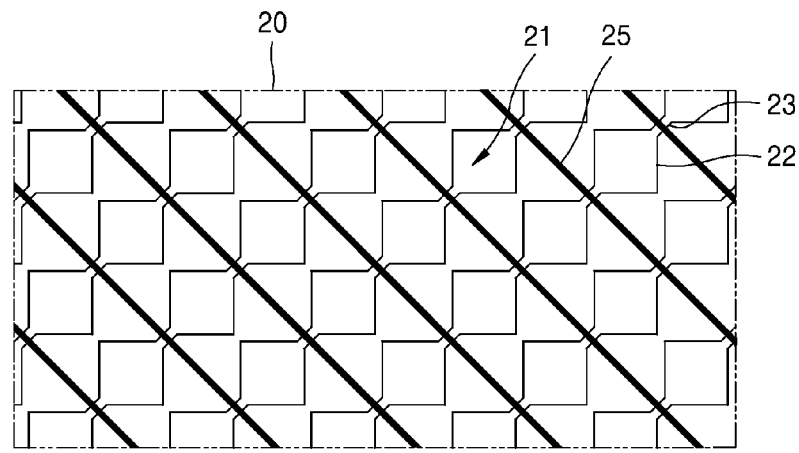
FIGS. 5 and 6 show examples of a first touch electrode and a second touch electrode of a fingerprint and touch sensor according to an example embodiment.
Figure 6:
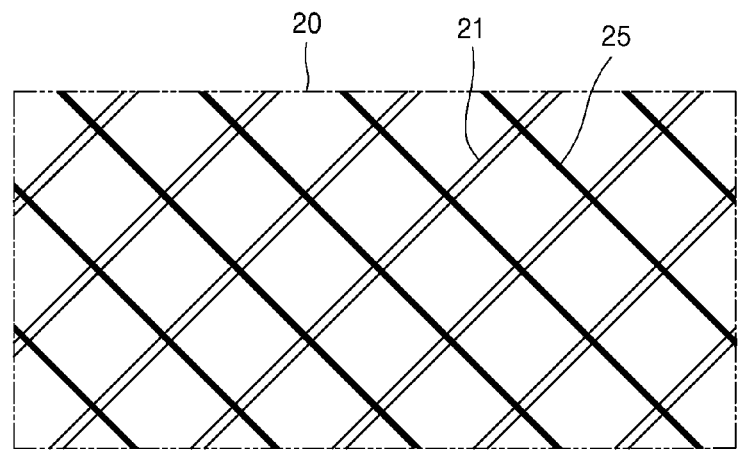

FIGS. 2 and 3 show examples in which both the first touch electrode 21 and the second touch electrode 25 include a plurality of polygonal pattern parts 22 and 26 and connection parts 23 and 27 therebetween. As shown in FIG. 5, one of the first touch electrode 21 and the second touch electrode 25 may include a plurality of polygonal pattern parts and connection parts therebetween and the other may have a line electrode. FIG. 5 shows an example in which the first touch electrode 21 includes a plurality of polygonal pattern parts 22 and a connection part 23 therebetween, and the second touch electrode 25 is a line electrode. The first touch electrode 21 may be a line electrode, and the second touch electrode 25 may have a plurality of polygonal pattern parts and a connection part therebetween. In addition, both the first touch electrode 21 and the second touch electrode 25 may have line electrodes as shown in FIG. 6.

Referring to FIGS. 1 and 2 again, as described above, the fingerprint-touch sensing area 30 may include the fingerprint recognition area 31 in which the first and second fingerprint electrodes 32 and 33 are disposed and fingerprint sensing and touch sensing are performed and the wiring area 35 in which the first and second fingerprint electrodes 32 and 33 are extended for wiring and touch sensing is performed.

A plurality of first and second fingerprint electrodes 32 and 33 may be disposed in the fingerprint-touch sensing area 30 to be electrically separated from the first and second touch electrodes 21 and 25 of the touch sensing area 20.

The fingerprint recognition area 31 may include an array of a plurality of first fingerprint electrodes 32 and an array of a plurality of second fingerprint electrodes 33 intersecting the plurality of first fingerprint electrodes 32 to form an array of fingerprint sensing nodes that recognize fingerprints. That is, the plurality of first fingerprint electrodes 32 and the plurality of second fingerprint electrodes 33 may be formed in a linear electrode pattern, and may intersect each other in the fingerprint recognition area 31.

The plurality of first fingerprint electrodes 32 and the plurality of second fingerprint electrodes 33 may be arranged at a smaller pitch than the first and second touch electrodes 21 and 25. For example, the plurality of first and second fingerprint electrodes 32 and 33 may be formed to have an interval corresponding to a resolution required for fingerprint sensing in a linear electrode pattern.

To this end, the first and second fingerprint electrodes 32 and 33 may be formed to correspond to a boundary between sub-pixels of the touch screen 1, and may be formed at an interval of at least one sub-pixel. For example, the first and second fingerprint electrodes 32 and 33 may be formed as linear electrode patterns at positions corresponding to boundaries between sub-pixels of the touch screen 1, for example, at two or more sub-pixel intervals.

When the metal mesh 29 is formed on each of the polygonal pattern parts 22 and 26 of the first and second touch electrodes 21 and 25 and the metal mesh 29 is disposed on a non-light emission area between sub-pixel light emission areas, the first and second fingerprint electrodes 32 and 33 may be formed as a linear electrode pattern at the same pitch as the pattern distribution of the metal mesh 29, for example, a position corresponding to the boundary between sub-pixels of the touch screen 1, for example, at two or more sub-pixel intervals.

As described above, when the first and second fingerprint electrodes 32 and 33 are formed to be positioned at a boundary between sub-pixels in a linear electrode pattern, light transmission may be secured.

The plurality of first fingerprint electrodes 32 and the plurality of second fingerprint electrodes 33 disposed in the fingerprint recognition area 31 may extend to the wiring area 35 for wiring. In the wiring area 35, the first and second fingerprint electrodes 32 and 33 may be further arranged at the same interval as in the fingerprint recognition area 31. A portion of the first and second fingerprint electrodes 32 and 33 further disposed in the wiring area 35 may be used for touch sensing, and the remaining fingerprint electrodes may correspond to dummy electrodes. Here, the first and second fingerprint electrodes 32 and 33 in the wiring area 35 may be arranged only at intervals required for touch sensing.

Moreover, like the first and second touch electrodes 21 and 25, it is possible to provide a structure in which the plurality of first and second fingerprint electrodes 32 and 33 are located on different layers and an insulating layer is formed therebetween, or the plurality of first and second fingerprint electrodes 32 and 33 are located at different levels only at the intersections and an insulating layer is formed therebetween.

The fingerprint-touch sensing area 30 may be located on one side (or a side portion) of the touch screen 1, and in order to provide user convenience, the fingerprint recognition area 31 of the fingerprint-touch sensing area 30 may be positioned to be spaced apart from an outer edge of the touch screen 1, for example, the outer edge of the display screen of the electronic device that applies the fingerprint and touch sensor according to an example embodiment to the display screen. For example, the fingerprint-touch sensing area 30 may be located on a lower portion of the touch screen 1, and the fingerprint recognition area 31 of the fingerprint-touch sensing area 30 may be positioned to be spaced somewhat inwardly from a lower outer edge of the touch screen 1 (e.g., toward an inside portion from the lower outer edge of the touch screen 1).

FIGS. 1 and 2 show examples in which the fingerprint-touch sensing area 30 is provided on the lower portion (or lower side) of the touch screen 1 and the fingerprint recognition area 31 is provided to be spaced inwardly from a middle of the lower outer edge of the touch screen 1. However, embodiments are not limited thereto, and the location and a separation distance of the fingerprint recognition area 31 relative to the fingerprint-touch sensing area 30 and/or the touch screen 1 may be variously determined in consideration of user convenience. For example, the fingerprint-touch sensing area 30 may be positioned according to the needs of the user, such as a lower left portion, a lower right portion, a left or right portion, an upper left portion, a middle portion, or an upper right portion of the touch screen 1, and the fingerprint recognition area 31 of the fingerprint-touch sensing area 30 at a certain location may be positioned to be spaced inwardly from the outer edge of the touch screen 1.

Furthermore, in order for the RC constant of the fingerprint sensor, that is, resistance and parasitic capacitance, to be reduced by shortening a wiring length of the first and second fingerprint electrodes 32 and 33, the position of the fingerprint-touch sensing area 30 and the arrangement of the first and second fingerprint electrodes 32 and 33 in the fingerprint-touch sensing area 30 may be determined.

For example, the fingerprint-touch sensing area 30 forms a triangular shape on the lower side of the touch screen 1, as in FIGS. 1 to 3, and the fingerprint recognition area 31 may be formed to form a rhombus shape on an upper side (or top portion) of the triangular shape of the fingerprint-touch sensing area 30.

To this end, the plurality of first fingerprint electrodes 32 may extend in a first direction, for example, first diagonal direction of the touch screen 1, and may be arranged side by side in a second direction, for example, a second diagonal direction of the touch screen 1, and the plurality of second fingerprint electrodes 33 may extend in the second direction, for example, the second diagonal direction, so as to intersect the plurality of first fingerprint electrodes 32 and may be arranged side by side in the first direction, for example, the first diagonal direction. In addition, the plurality of first and second fingerprint electrodes 32 and 33 arranged to intersect each other in the diagonal direction of the touch screen 1 may be disposed at a pitch smaller than that of the first and second touch electrodes 21 and 25 of the touch sensing area 20.

As described above, by arranging the first and second fingerprint electrodes 32 and 33 in a diagonal direction to intersect each other, the fingerprint recognition area 31 may be formed to have a rhombus shape.

The first and second fingerprint electrodes 32 and 33 may be extended for wiring, as in FIGS. 2 and 3, and the wiring area 35 formed in this manner may correspond to remaining areas except for the fingerprint recognition area 31, which forms a rhombus shape and positioned at a top portion of the fingerprint-touch sensing area 30 having the triangular shape.

When the first and second fingerprint electrodes 32 and 33 are arranged in a diagonal direction to intersect each other such that the fingerprint-touch sensing area 30 forms a triangular shape and the fingerprint recognition area 31 is positioned to be spaced inwardly from the outer edge of the touch screen 1, since the wiring length of the first and second fingerprint electrodes 32 and 33 may be reduced, it is possible to obtain a sufficient driving speed required for fingerprint recognition as exhibiting small resistance characteristics. That is, the resistance and parasitic capacitance in the fingerprint-touch sensing area 30 may be reduced, that is, the RC constant may be reduced, and accordingly, a driving speed of approximately 1 MHz or more sufficient for fingerprint sensing may be achieved, thereby enabling smooth driving of the fingerprint sensor.

As described above, when the first and second fingerprint electrodes 32 and 33, for example, are formed to be located at a boundary between sub-pixels in a linear electrode pattern, light transmittance may be secured and the wiring length of the first and second fingerprint electrodes 32 and 33 in the fingerprint-touch sensing area 30 may be shortened. Therefore, since the resistance may be sufficiently lowered, a driving speed of approximately 1 MHz or more sufficient for fingerprint sensing may be achieved so that it is possible to smoothly drive the fingerprint sensor while ensuring sufficient light transmittance.

Furthermore, a portion of the first and second fingerprint electrodes 32 and 33 in the fingerprint recognition area 31 may be used as a combined electrode for fingerprint sensing and touch sensing, and accordingly, a portion of the fingerprint sensing node may be used as the touch sensing node 30a to perform fingerprint sensing and touch sensing. In addition, electrodes that intersect the extension portions of the first and second fingerprint electrodes 32 and 33 used as a combination electrode are further formed in the wiring area 35 so that a plurality of touch sensing nodes 30b may be further formed in the wiring area 35. Further, electrode patterns may be further formed in the wiring area 35 in addition to the first and second fingerprint electrodes 32 and 33 extending from the fingerprint recognition area 31 such that the light transmission characteristics in the wiring area 35 are the same or similar to the light transmission characteristics in the fingerprint recognition area 31.

For example, the first and second fingerprint electrodes 32 and 33 may be formed at regular intervals throughout the fingerprint recognition area 31 and the wiring area 35. The first and second fingerprint electrodes 32 and 33 intersecting in the fingerprint recognition area 31 are electrically connected to the touch-fingerprint sensing circuit 40 through wiring, the first and second fingerprint electrodes 32 and 33 disposed only in the wiring area 35 are only partially connected to the touch-fingerprint sensing circuit 40 through wiring for touch sensing, and the rest may not be electrically connected to the touch-fingerprint sensing circuit 40 through wiring.

That is, the first and second fingerprint electrodes 32 and 33 of the fingerprint-touch sensing area 30 may be disposed at regular intervals in smaller pitch than the first and second touch electrodes 21 and 25 of touch sensing area 20 such that the plurality of first fingerprint electrodes 32 extend in the first direction, for example, in the first diagonal direction of the touch screen 1 over the entire fingerprint-touch sensing area 30, and the plurality of second fingerprint electrodes 33 extend in the second direction, for example, the second diagonal direction of the touch screen 1 over the entire fingerprint-touch sensing area 30, so as to intersect the plurality of first fingerprint electrodes 32. The first and second fingerprint electrodes 32 and 33 passing through the fingerprint recognition area 31 are electrically connected to the touch-fingerprint sensing circuit 40 through wiring to enable fingerprint sensing and touch sensing, and only a portion of the first and second fingerprint electrodes 32 and 33 passing through only the wiring area 35 may be electrically connected to the touch-fingerprint sensing circuit 40 through wiring for touch sensing. By allowing the first and second fingerprint electrodes 32 and 33 passing through the fingerprint recognition area 31 to be electrically connected to the fingerprint sensing circuit 45 of the touch-fingerprint sensing circuit 40 through wiring, fingerprint recognition in the fingerprint recognition area 31 may be achieved through an arrangement of fingerprint sensing nodes formed at the portions where the first and second fingerprint electrodes 32 and 33 intersect each other in the fingerprint recognition area 31. Touch recognition in the fingerprint-touch sensing area 30 may be achieved by enabling only the first and second fingerprint electrodes 32a and 33a of the fingerprint recognition area 31 and the wiring area 35, passing through the positions corresponding to the arrangement of the touch sensing nodes 30a and 30b of the same spacing as in the touch sensing area 20, to be electrically connected to the touch sensing circuit 41 of the touch-fingerprint sensing circuit 40 through wiring. In this case, the first and second fingerprint electrodes 32a and 33a passing through the fingerprint recognition area 31 correspond to a combined electrode for fingerprint and touch sensing. In FIG. 2, reference numerals 32a and 33a respectively denote fingerprint electrodes (bold lines) used for touch sensing among the first and second fingerprint electrodes 32 and 33.

In this case, electrical connection of the first and second fingerprint electrodes 32a and 33a to the touch sensing circuit 41 of the touch-fingerprint sensing circuit 40 may be determined such that a distance between the touch sensing nodes 30a and 30b in the fingerprint recognition area 31 and the wiring area 35 is greater than a distance between the fingerprint sensing nodes in the fingerprint recognition area 31, and the spacing (e.g., intervals) of the touch sensing nodes in the touch sensing area 20, the fingerprint recognition area 31 and the wiring area 35 is approximately constant.

For example, when an arrangement interval of the touch sensing node in the touch sensing area 20 is D1, an arrangement interval of the fingerprint sensing node in the fingerprint recognition area 31 is D2, an interval of the touch sensing node in the fingerprint recognition area 31 is D3, and an interval of the touch sensing node in the wiring area 35 is D4, a relationship that D1, D3, D4>D2 may be satisfied. Further, D1, D3, and D4 may be determined to have an interval within a range that maintains the linearity of touch sensing, for example, the same or similar interval.

As described above, the fingerprint and touch sensor 10 according to an embodiment is configured to include a touch only recognition area, that is, a touch sensing area 20 and a fingerprint-touch sensing area 30 electrically separated therefrom such that the resistance and parasitic capacitance values in each area may be reduced. Therefore, it is possible to be driven at a frequency suitable for each sensor. In addition, since the fingerprint-touch sensing area 30 includes the fingerprint recognition area 31 for simultaneous fingerprint-touch sensing and the wiring area 35 in which touch only sensing is performed, the fingerprint recognition area 31 may be positioned slightly inwardly from the outer edge of the touch screen 1, for example, the display screen, to provide user convenience. The touch sensing elements in the fingerprint recognition area 31, which is the fingerprint and touch sensor area, may be arranged to be connected at the same period as the touch position in the wiring area 35, which is the touch-only recognition area of the outer edge, so that touch sensing linearity may be maintained.

Moreover, a portion of the first and second fingerprint electrodes 32 and 33 may be used for both fingerprint sensing and touch sensing, and a time division method may be used for the fingerprint-touch sensing function. Also, functions may be changed when a touch mode and a fingerprint mode are selected. For example, the fingerprint-touch sensing area may not require complete simultaneous sensing of a fingerprint and touch in time, and in the same area. For example, only fingerprint recognition is possible in a fingerprint mode, only touch recognition is possible in a touch mode, and/or it may appear that fingerprint and touch recognition is achieved simultaneously by going back and forth between the fingerprint mode and the touch mode in a short time in a time-division manner.

Furthermore, according to the fingerprint and touch sensor 10 according to an example embodiment, since there is a difference between touch signals in the touch sensing area 20, which is a touch only recognition area, and the fingerprint-touch sensing area 30, when the touch recognition in the fingerprint-touch sensing area 30 is performed, a circuit may be configured to match a signal and noise level by using an amplifier, and the like in the touch sensing circuit 41, and in terms of software, the signal may be corrected to be continuously connected at the boundary between areas, so that the touch sensing function between areas may be effectively and smoothly performed.

According to the fingerprint and touch sensor 10 according to an example embodiment, driving of the capacitive fingerprint and touch sensor may be efficiently performed on a display screen of a smartphone size or larger, and touch sensing may be efficiently performed in all areas of the display screen.

In the above, the case where the first direction in which the first touch electrode 21 extends is the first diagonal direction of the touch screen 1, and the second direction in which the second touch electrode 25 extends is the second diagonal direction of the touch screen 1 is provided as an example, and the example embodiment is not limited thereto, and various embodiments are possible. For example, the first and second touch electrodes 21 and 25 may be arranged such that the first direction in which the first touch electrode 21 extends may be the second diagonal direction of the touch screen 1, and the second direction in which the second touch electrode 25 extends may be the first diagonal direction of the touch screen 1, or one of the first direction and the second direction is a horizontal (or X-axis) direction and the other direction is a vertical (or Y-axis) direction.

Figure 7:
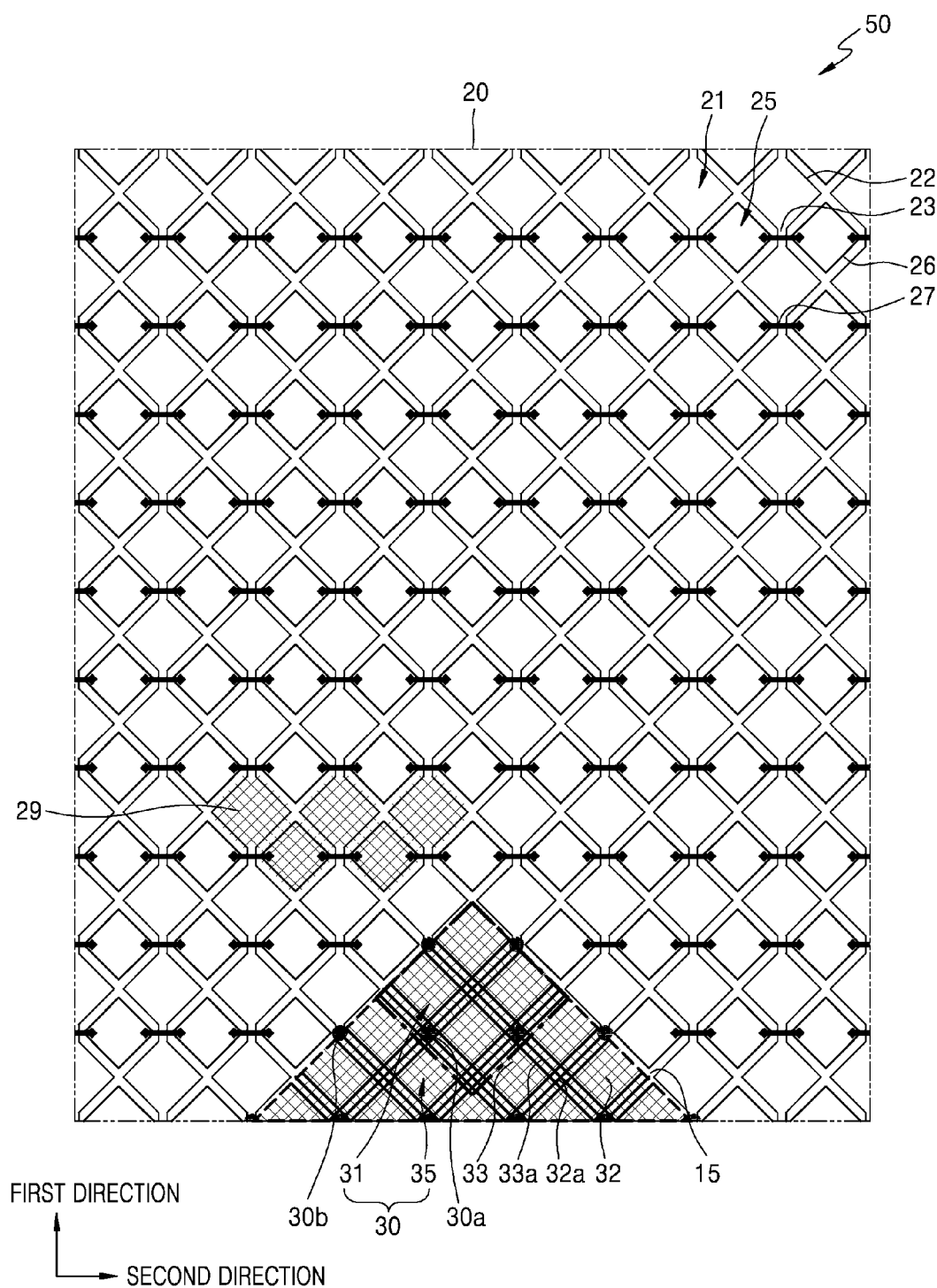
FIG. 7 schematically shows a fingerprint and touch sensor according to an example embodiment.

FIG. 7 schematically shows a fingerprint and touch sensor 50 according to an example embodiment, and shows an example of a case where a first direction is a vertical direction and a second direction is a horizontal direction. Compared to FIG. 1, the embodiment of FIG. 7 has a difference in that ones of the first and second touch electrodes 21 and 25 arranged in the touch sensing area 20 are arranged in the horizontal direction and other ones are arranged in the vertical direction. In FIG. 7, the same or similar component as in FIG. 1 is denoted by the same reference numerals, and repeated description is omitted.

Referring to FIG. 7, according to the fingerprint and touch sensor 50 according to an example embodiment, the first direction and the second direction in which the first touch electrode 21 and the second touch electrode 25 that are arranged for touch sensing in the touch sensing area 20 extend may be, for example, a vertical direction and a horizontal direction, respectively. The first touch electrode 21 may extend in a vertical direction, for example, and a plurality of first touch electrodes 21 may be arranged in a horizontal direction. The second touch electrode 25 may extend in a horizontal direction, for example, and a plurality of second touch electrodes 25 may be arranged in a vertical direction. However, embodiments are not limited thereto, and the first touch electrode 21 may extend in the horizontal direction, for example, and a plurality of first touch electrodes 21 may be arranged in the vertical direction, and the second touch electrode 25 may extend in the vertical direction, for example, and the plurality of second touch electrodes 25 may be arranged in a horizontal direction.

Even in the case of the embodiment of FIG. 7, it is possible to provide a structure in which the first and second touch electrodes 21 and 25 are located on different layers and an insulating layer is formed therebetween, or the first and second touch electrodes 21 and 25 are located at the same level, the first and second touch electrodes 21 and 25 are located at different levels at the intersections, and an insulating layer is formed therebetween.

Further, at least one of the first touch electrode 21 and the second touch electrode 25 may include a plurality of polygonal pattern parts 22 and 26 and connection parts 23 and 27 therebetween, and the polygonal pattern parts 22 and 26 may have, for example, a rhombus shape. Further, the polygonal pattern parts 26 and 26 may have a structure in which, for example, a metal mesh 29 is formed. In FIG. 7, the metal mesh 29 is shown only in a portion of the polygonal pattern parts 22 and 26 of the first touch electrode 21 and the second touch electrode 25, and this is for the convenience of the illustration, and each of the polygonal pattern parts 22 and 26 of the first and second touch electrodes 21 and 25 may have a structure in which the metal mesh 29 is formed. As another example, only a portion of the polygonal pattern parts 22 and 26 forming the first and second touch electrodes 21 and 25 may have a structure in which the metal mesh 29 is formed.

The metal mesh 29 may be patterned to correspond to the boundary between the sub-pixels of the touch screen 1 as described with reference to FIGS. 2 and 3 so that the opening of the metal mesh 29 may be formed to correspond to the light emission area of the sub-pixels of the display.

In the case of the fingerprint and touch sensor 50 according to an example embodiment, when at least one of the first touch electrode 21 and the second touch electrode 25 is formed to include a plurality of polygonal pattern parts 22 and 26 and connection parts 23 and 27 therebetween and the polygonal pattern parts 22 and 26 are formed with a structure in which the metal mesh 29 is formed to correspond to the boundary between sub-pixels, it is possible to sufficiently lower the resistance in the touch sensing area 20 while ensuring light transmittance, so that resistance and parasitic capacitance in the touch sensing area 20 may be reduced. Therefore, a driving speed of 200 kHz or more sufficient for touch sensing, for example, a driving speed of approximately 300 kHz or more, may be achieved, and smooth driving of the touch sensor becomes possible.

FIG. 7 shows a case where the polygonal pattern parts 22 and 26 have a rhombus shape, and the shape of the polygonal pattern parts 22 and 26 may have various shapes such as quadrangles of different shapes, triangles, pentagons or hexagons. FIG. 7 shows that both the first touch electrode 21 and the second touch electrode 25 include a plurality of polygonal pattern parts 22 and 26 and connection parts 23 and 27 therebetween, and as described with reference to FIGS. 5 and 6, one of the first touch electrode 21 and the second touch electrode 25 may include a plurality of polygonal pattern parts and connection parts therebetween, and the other may have a line electrode, or both the first touch electrode 21 and the second touch electrode 25 may have line electrodes.

As illustrated in FIG. 7, when the first direction and the second direction in which the first touch electrode 21 and the second touch electrode 25 that are arranged for touch sensing in the touch sensing area 20 extend are, for example, a vertical direction and a horizontal direction, respectively, and the fingerprint-touch sensing area 30 is arranged in a triangular shape on the lower side of the touch screen 1, the extension of a portion of the first touch electrode 21 is blocked in the vertical direction by the fingerprint-touch sensing area 30, and a portion of the second touch electrode 25 is blocked in a horizontal direction by the fingerprint-touch sensing area 30 in linearly electrical wiring with the touch-fingerprint sensing circuit 40.

Figure 8:
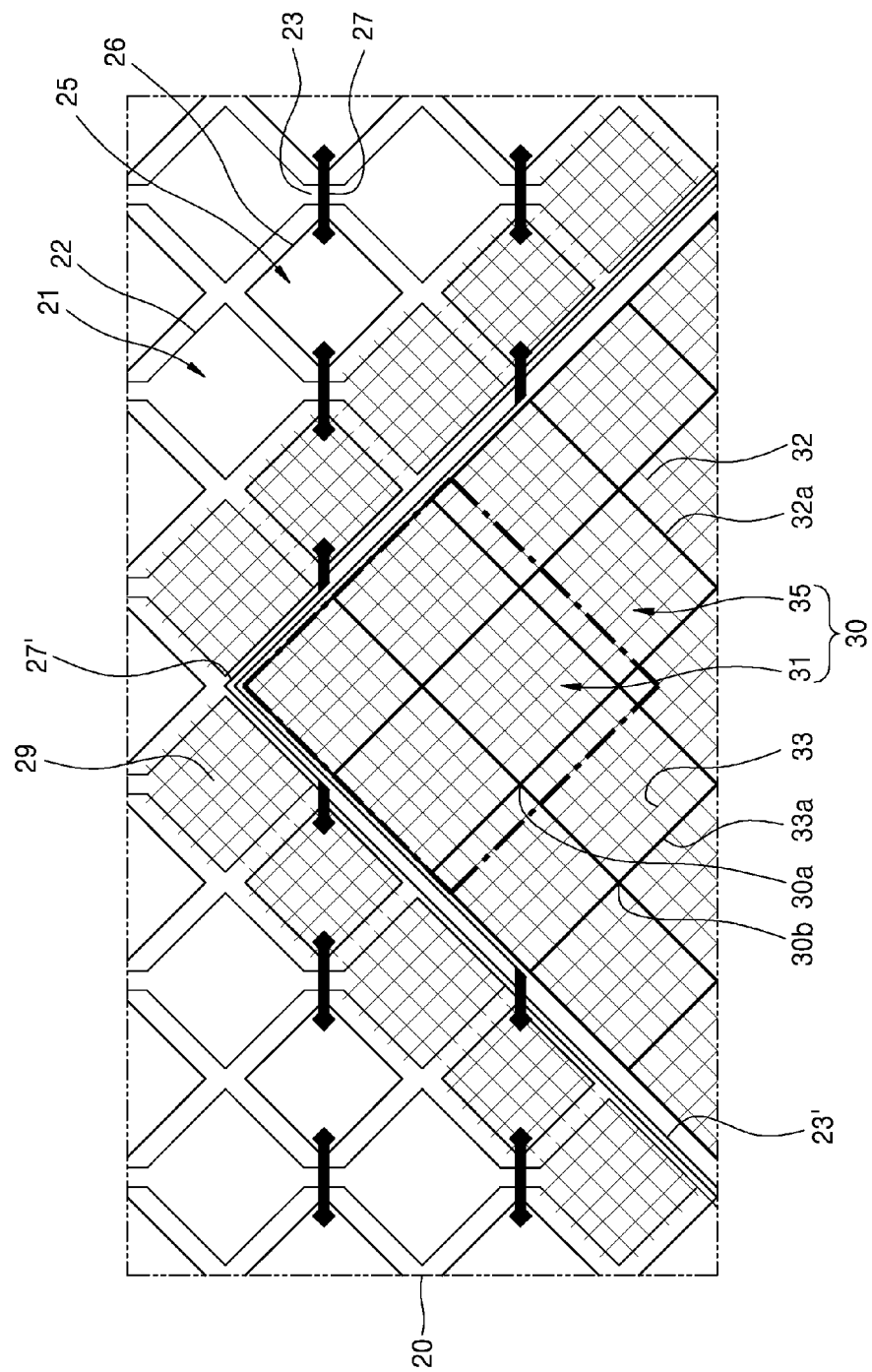
FIG. 8 is a partially enlarged view of FIG. 7.

In this case, for the electrical connection for extending in the vertical direction of a portion of the first touch electrode 21 and for electrical wiring with the touch-fingerprint sensing circuit 40 of a portion of the second touch electrode 25, as shown in FIG. 8, a boundary area 15 between the touch sensing area 20 and the fingerprint-touch sensing area 30 may be used.

FIG. 8 is an enlarged view of the boundary area 15 of the touch sensing area 20 and the fingerprint-touch sensing area 30 of FIG. 7. In FIG. 8, for convenience, the metal mesh 29 is only displayed on a portion of the polygonal pattern parts 22 and 26.

As in FIG. 8, electrical connection for extending in the horizontal direction with respect to a portion of the second touch electrode 25 may be achieved by forming a connection part 27' along the boundary area 15. In addition, electrical wiring 23' for extending in the vertical direction with respect to a portion of the first touch electrode 21 may be formed along the boundary area 15.

Figure 9:
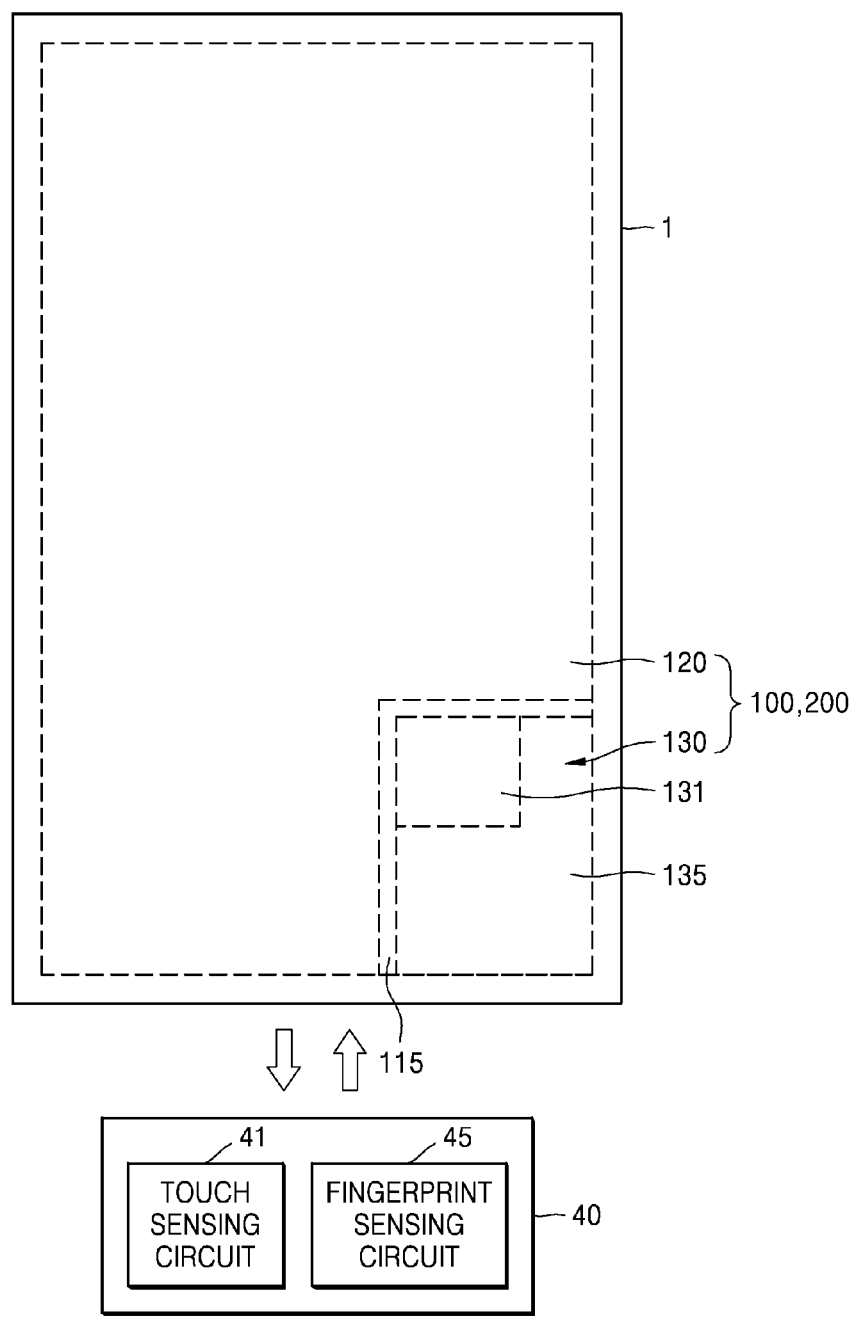
FIG. 9 schematically shows a touch screen of an electronic device to which a fingerprint and touch sensor according to an example embodiment is applied.

In the above, when the sub-pixel of the touch screen 1 has a diamond PenTile type arrangement, the example embodiments in which the fingerprint-touch sensing area 30 is arranged in the middle of the lower side of the touch screen 1 are described and illustrated. However, embodiments are not limited thereto and, for example, in the fingerprint-touch sensing area 30, instead of arranging the first and second fingerprint electrodes 32 and 33 in a diagonal direction in the middle of the lower side of the touch screen 1 for forming triangle shape, the fingerprint-touch sensing area 30 may be arranged in a corner of the touch screen 1 as shown in FIG. 9. When arranging the fingerprint-touch sensor area 30 in a corner, the first and second fingerprint electrodes 32 and 33 may be arranged in a vertical direction and a horizontal direction, respectively.

Figure 10:
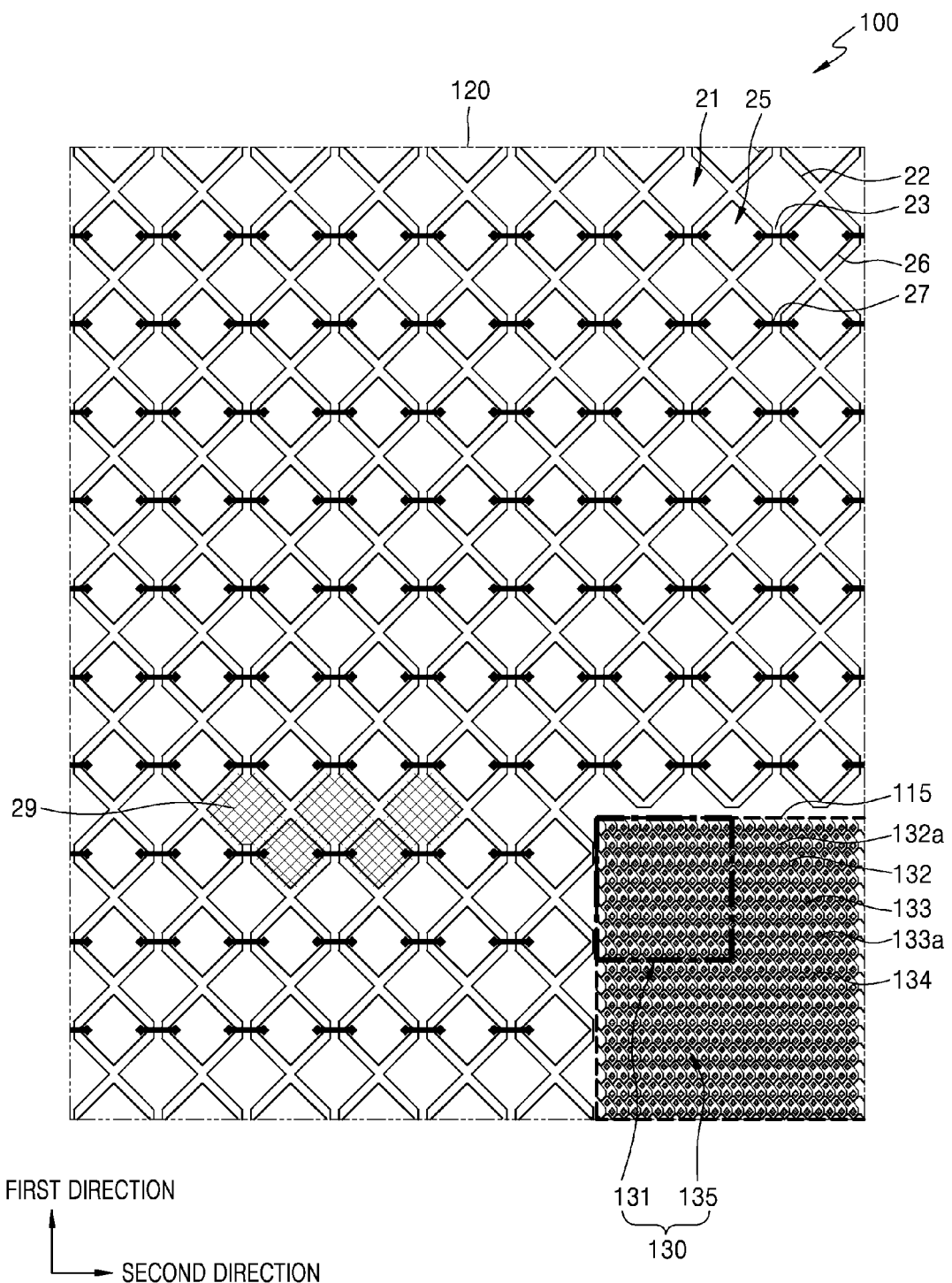
FIGS. 10 and 11 show a fingerprint and touch sensor according to an example embodiment in which a fingerprint-touch sensing area is arranged in a corner.
Figure 11:
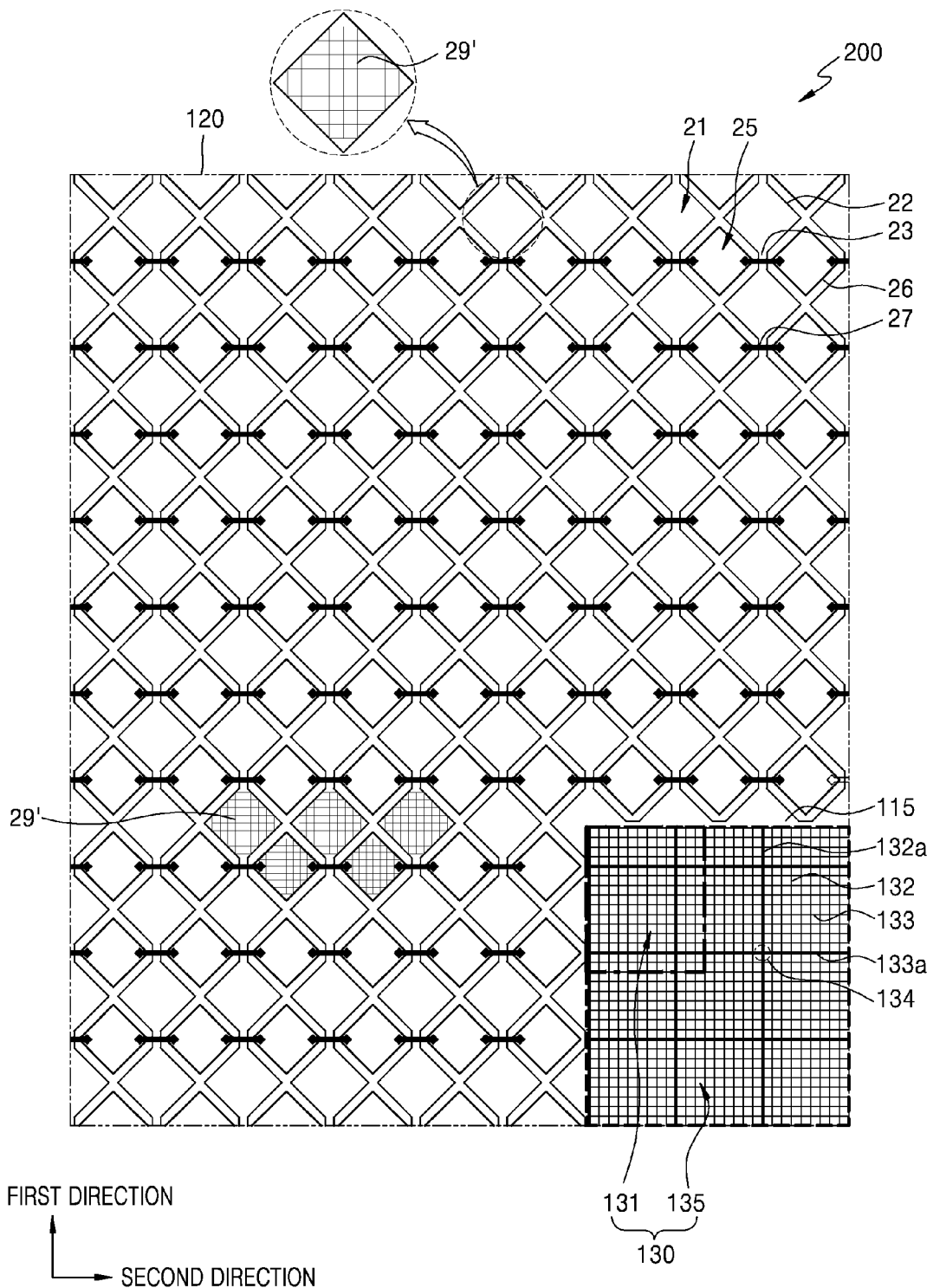

FIG. 9 schematically shows a touch screen 1 of an electronic device being applied with the fingerprint and touch sensors 100 and 200 according to an example embodiment in which a fingerprint-touch sensing area 130 is arranged in a corner. FIGS. 10 and 11 show the fingerprint and touch sensors 100 and 200 according to an example embodiment in which a fingerprint-touch sensing area 130 is arranged in a corner. Compared to the fingerprint and touch sensors 10 and 50 described with reference to FIGS. 1, 2, and 7, FIGS. 9 to 11 have a difference in that the fingerprint-touch sensing area 130 is provided on the corner side of the touch screen 1. FIGS. 9 to 11 illustrate a case where the fingerprint-touch sensing area 130 is provided in a lower right corner of the touch screen 1. As another example, the fingerprint-touch sensing area 130 may be provided in a lower left corner of the touch screen 1 or may be provided in an upper right or a left corner. Here, substantially the same or similar components as in the above-described embodiment are denoted by the same reference numerals, and repeated descriptions are omitted.

Referring to FIGS. 9 to 11, the fingerprint and touch sensors 100 and 200 are applied to the touch screen 1 of the electronic device to sense a user's touch and fingerprint, and may include a touch sensing area 120 where only touch sensing is performed, and a fingerprint-touch sensing area 130. The fingerprint-touch sensing area 130 may include a fingerprint recognition area 131 where fingerprint sensing and touch sensing are performed and a wiring area 135 where first and second fingerprint electrodes 132 and 133 arranged in the fingerprint recognition area 131 are extended and only touch sensing is performed. In order for the fingerprint recognition area 131 to be positioned spaced inwardly from the outer edge of the touch screen 1, as in FIGS. 10 and 11, the first and second fingerprint electrodes 132 and 133 may be arranged in the first direction and the second direction, for example, vertical and horizontal directions. The first and second fingerprint electrodes 132 and 133 may be extended for wiring, and the wiring area 135 formed by this may correspond to the remaining areas except for the fingerprint recognition area 131.

The touch sensing area 120 and the fingerprint-touch sensing area 130 may be electrically separated from each other. The touch sensing area 120 and the fingerprint-touch sensing area 130 are formed to have a boundary area 115 therebetween, and may be substantially spatially separated. In the boundary area 115 corresponding to the boundary between the touch sensing area 120 and the fingerprint-touch sensing area 130, a first wiring for touch sensing of the touch sensing area 120 and a second wiring for fingerprint and touch sensing of the fingerprint-touch sensing area 130 may be disposed. Even in this case, since there is no direct electrical connection between the first and the second wirings, the touch sensing area 120 and the fingerprint-touch sensing area 130 may be electrically separated from each other.

Referring to FIGS. 10 and 11, like the touch sensing area 20 described above, in the touch sensing area 120, the first and second touch electrodes 21 and 25 may be arranged to form an array of touch sensing nodes. FIGS. 10 and 11 show an example in which the first touch electrode 21 and the second touch electrode 25 arranged for touch sensing in the touch sensing area 120 have the same arrangement as in FIG. 7. As described above with reference to FIG. 7, one of the first touch electrode 21 and the second touch electrode 25 may extend in the horizontal direction and the other may extend in the vertical direction to intersect each other. As described above with reference to FIGS. 2 and 5 to 6, the first and second touch electrodes 21 and 25 arranged in the touch sensing area 120 may be arranged to intersect each other in a diagonal direction.

In addition, in FIGS. 10 and 11, the first touch electrode 21 and the second touch electrode 25 arranged for touch sensing in the touch sensing area 120 each have a plurality of polygonal pattern parts 22 and a connection part 23 therebetween. FIGS. 10 and 11 show cases where the polygonal pattern parts 22 and 26 have a rhombus shape, which are merely examples, and the shape of the polygonal pattern parts 22 and 26 may have various shapes such as quadrangles of different shapes, triangles, pentagons or hexagons. As described above, at least a portion of the polygonal pattern parts 22 and 26 may have a structure in which the metal meshes 29 and 29' are formed. In FIGS. 10 and 11, the metal meshes 29 and 29' are shown only in a portion of the polygonal pattern parts 22 and 26 of the first touch electrode 21 and the second touch electrode 25, and this is for convenience of illustration. As another example, only a portion of the polygonal pattern parts 22 and 26 forming the first and second touch electrodes 21 and 25 may have a structure in which the metal meshes 29 and 29' are formed. Furthermore, in relation to the first and second touch electrodes 21 and 25 arranged in the touch sensing area 120, as described above with reference to FIGS. 5 and 6, at least one touch electrode may have a line electrode shape.

As shown in FIGS. 10 and 11, in the case of the first and second touch electrodes 21 and 25 arranged in the touch sensing area 120, as mentioned above, it is possible to provide a structure in which the first and second touch electrodes 21 and 25 are located on different layers and an insulating layer is formed therebetween, or the first and second touch electrodes 21 and 25 are located at the same level and are located at different levels only at intersections, and an insulating layer is formed therebetween.

FIG. 10 shows an example in which sub-pixels of the touch screen 1 are arranged in a diamond PenTile type. When the sub-pixels of the touch screen 1 are arranged in a diamond PenTile type, the metal mesh 29 may be formed in a diagonal direction to correspond to a non-light emission area on the boundary of sub-pixels of a diamond PenTile pixel structure.

FIG. 11 shows an example in which sub-pixels of the touch screen 1 are arranged in vertical and horizontal directions in a rectangular shape. When the sub-pixels of the touch screen 1 are arranged in vertical and horizontal directions in a rectangular shape, the metal mesh 29' may be formed in vertical and horizontal directions to correspond to a non-light emission area between sub-pixels.

For example, as shown in the partial enlarged view of FIG. 11, the metal mesh 29' may be formed to correspond on the boundary of the sub-pixels so that the sub-pixels are arranged in vertical and horizontal directions in a rectangular shape. For example, in the case of a structure in which a fingerprint and touch sensor 200 is provided on an OLED display pixel in which sub-pixels are arranged in vertical and horizontal directions in a rectangular shape, the metal mesh 29' may be arranged on a non-light emission area between sub-pixels of the OLED. In addition, in the case of a structure in which the touch screen 1 is provided with a fingerprint and touch sensor 100 on an LCD pixel in which sub-pixels are arranged in vertical and horizontal directions in a rectangular shape, the metal mesh 29' may be arranged on the black matrix area of the color filter.

Referring to FIGS. 10 and 11, the first and second fingerprint electrodes 132 and 133 formed on the fingerprint-touch sensing area 130 may be electrically separated from the first and second touch electrodes 21 and 25 formed on the touch sensing area 20.

The fingerprint-touch sensing area 130 may include a fingerprint recognition area 131 for forming an array of fingerprint sensing nodes by intersection of the first and second fingerprint electrodes 132 and 133, and a wiring area 135 for wiring the first and second fingerprint electrodes 132 and 133.

As in FIG. 10, even when the sub-pixels of the touch screen 1 are arranged in a diamond PenTile type, the fingerprint-touch sensing area 130 may be provided in a corner of the touch screen 1, for example, a lower right corner of the touch screen 1.

Since the sub-pixels of the touch screen 1 are arranged in a diamond PenTile type, the first and second fingerprint electrodes 132 and 133 have a structure extending in vertical and horizontal directions and also have a shape configured for a zigzag or slightly detouring for avoiding sub-pixels. For example, each of the first fingerprint electrode 132 and the second fingerprint electrode 133 may extend as a half-diamond pattern electrode in a first direction and a second direction, that is, a vertical direction and a horizontal direction to be located on a non-light emission area of sub-pixels arranged in a diamond PenTile type. The first fingerprint electrode 132 may extend in the horizontal direction and the second fingerprint electrode 133 may extend in the vertical direction. In FIG. 10, reference numeral 134 denotes a portion where the first fingerprint electrode 132 and the second fingerprint electrode 133 intersect each other.

In this case, it is possible to provide a structure in which the first and second fingerprint electrodes 132 and 133 are located on different layers and an insulating layer is formed therebetween, or the first and second fingerprint electrodes 132 and 133 are located at the same level and are located at different levels at the intersections, and an insulating layer is formed therebetween.

In addition, in order to show that the first and second fingerprint electrodes 132 and 133 in the form of a half-diamond pattern electrode are configured to avoid sub-pixels, FIG. 10 shows that the sub-pixel in the fingerprint-touch sensing area 30 is enlarged and thus, the interval of the first and second fingerprint electrodes 132 and 133 is enlarged. As in FIGS. 2, 3, and 7, the actual arrangement intervals of the first and second fingerprint electrodes 132 and 133 have a pitch smaller than that of the first and second touch electrodes 21 and 25 in the touch sensing area 120. In addition, FIG. 10 shows an example in which the first and second fingerprint electrodes 132 and 133 are formed at two sub-pixel intervals. In another example, the first and second fingerprint electrodes 132 and 133 may be formed at one sub-pixel interval or three or more sub-pixel intervals. In addition, FIG. 10 shows an example in which the touch sensing node is formed with a small number of fingerprint electrode intervals, and the touch sensing node may be formed with a larger number of fingerprint electrode intervals, as shown in FIGS. 2, 3, and 7.

FIG. 11 schematically shows a fingerprint and touch sensor 200 according to another example embodiment of arranging a fingerprint-touch sensing area 130 in a corner. Compared to the fingerprint and touch sensor 100 described with reference to FIG. 10, there is a difference in FIG. 11 in that the first and second fingerprint electrodes 132 and 133 are formed as a linear electrode pattern at a position corresponding to a boundary between sub-pixels of the touch screen 1, for example, in two or more sub-pixel intervals. As described above, the fingerprint and touch sensor 200 of FIG. 11 may be applied to a touch screen 1 having sub-pixels arranged in vertical and horizontal directions in a rectangular shape.

Referring to FIGS. 10 and 11, the fingerprint recognition area 131 of the fingerprint-touch sensing area 130 has an array of fingerprint sensing nodes located in a portion 134 where the first and second fingerprint electrodes 132 and 133 intersect, and a portion of the first and second fingerprint electrodes 132 and 133 may be used as a combined electrode for touch sensing. In FIGS. 10 and 11, reference numerals 132a and 133a respectively denote the first and second fingerprint electrodes for touch sensing among the first and second fingerprint electrodes 132 and 133.

In such a manner, among the first and second fingerprint electrodes 132 and 133 arranged to intersect each other in the fingerprint recognition area 131 of the fingerprint-touch sensing area 130, some fingerprint electrodes 132a and 133a may be used as a combined electrode for fingerprint sensing and touch sensing, and accordingly, fingerprint sensing and touch sensing may be performed by using a portion of the fingerprint sensing node as a touch sensing node.

The plurality of first fingerprint electrodes 132 and the plurality of second fingerprint electrodes 133 arranged in the fingerprint recognition area 131 may extend to the wiring area 135 for wiring, and also in the wiring area 135, the first and second fingerprint electrodes 132 and 133 may be further arranged at the same interval as the fingerprint recognition area 131. A portion of the first and second fingerprint electrodes 132 and 133 further disposed in the wiring area 135 may be used for touch sensing, and the remaining fingerprint electrodes may correspond to dummy electrodes. Here, the first and second fingerprint electrodes 132 and 33 in the wiring area 135 may be arranged only at intervals necessary for touch sensing.

In FIGS. 10 and 11, the fingerprint electrodes 132a and 133a represent fingerprint electrodes used for touch sensing among the first and second fingerprint electrodes 132 and 133 in the fingerprint-touch sensing area 130, and are indicated by bold lines. The fingerprint electrodes 132a and 133a arranged to intersect each other in the fingerprint recognition area 131 are used as a combined electrode for fingerprint sensing and touch sensing, and the fingerprint electrodes 132a or 133a arranged only in the wiring area 135 are arranged to intersect the fingerprint electrodes 133a or 132a extending in the fingerprint recognition area 131, and are used as electrodes for touch sensing.

In such a manner, among the first and second fingerprint electrodes 132 and 133, the fingerprint electrodes 132a and 133a positioned at intervals equal to or similar to the intervals of the first and second touch electrodes 21 and 25 in the touch sensing area 120 are used as electrodes for touch sensing, such that the arrangement interval of the touch sensing node in the fingerprint-touch sensing area 130 may have an interval equal to an arrangement interval of a touch sensing node in the touch sensing area 120 or a similar interval in a range that may maintain the linearity of touch sensing.

Accordingly, intervals of the touch sensing nodes in the touch sensing area 120, the fingerprint recognition area 131, and the wiring area 135 may be approximately constant.

Furthermore, even in the case of the embodiment of FIGS. 10 and 11, by providing the fingerprint-touch sensing area 130 in the corner of the touch screen 1, for example, in the lower right corner, since the wiring length of the first and second fingerprint electrodes 132 and 133 may be shortened and thus the RC constant of the fingerprint sensor, that is, resistance and parasitic capacitance, may be reduced, it is possible to achieve a driving speed of approximately 1 MHz or more sufficient for fingerprint sensing, thereby enabling smooth driving of the fingerprint sensor.

Moreover, as in FIGS. 10 and 11, even when the fingerprint-touch sensing area 130 is formed in a corner of the touch screen 1, for electrical wiring with the fingerprint-touch sensing circuit 40 of a portion of the first touch electrode 21 and a portion of the second touch electrode 25, the boundary area 115 between the touch sensing area 120 and the fingerprint-touch sensing area 130 may be used.

In the fingerprint and touch sensors 10, 50, 100, and 200 according to various example embodiments described above, the touch electrode and the fingerprint electrode may include metals including at least one of Ag, Cu, Al, and Mo, and may have a two-layer structure or a 1.5-layer structure connected by a bridge. A line width of the touch electrode and the fingerprint electrode may be about 4 µm or less, for example, 3 µm or less.

According to the fingerprint and touch sensors 10, 50, 100, and 200 according to the above-described example embodiments, since there may be a difference between touch signals in the touch sensing areas 20 and 120, which are touch only recognition areas, and the fingerprint-touch sensing areas 30 and 130, when the touch recognition in the fingerprint-touch sensing areas 30 and 130 is performed, a circuit may be configured to match the signal and noise level by using an amplifier, and the like in the touch sensing circuit 41, and in terms of software, the signal may be corrected to be continuously connected at the boundary between areas, so that the touch sensing function between areas may be effectively performed.

For example, in the case of the fingerprint-touch sensing area 30 where the signal is amplified using an amplifier and the signal is smaller (e.g., about 1/20 to about 1/5 level), the signal-to-noise ratio (SNR) may be improved by increasing the frequency to increase the number of integrals or by dithering. In addition, even when the SNR in the touch sensing areas 20 and 120 and the fingerprint-touch sensing areas 30 and 130 are matched, since an electrode configuration around the touch node is different even at the boundaries 15 and 115 of the separated area, a difference may occur in the signal, in the border neighboring node, a separate threshold value may be applied to perform touch sensing and additional correction may be performed for accurate position calculation.

Figure 12:
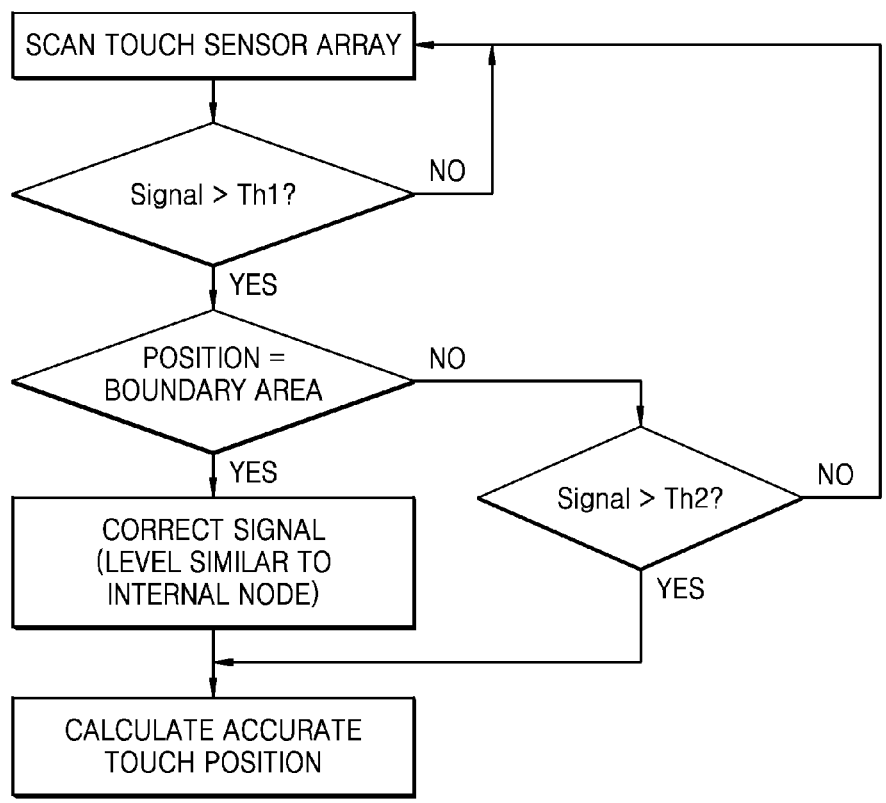
FIG. 12 shows a process for correcting touch sensing connectivity in a fingerprint and touch sensor according to an example embodiment.

FIG. 12 shows an example of a process for correcting touch sensing connectivity in a fingerprint and touch sensor according to an example embodiment.

Referring to FIG. 12, when the touch sensing signal is smaller than a threshold value Th1 of a relatively small boundary area node, the process of scanning the touch sensor array is repeated and when the touch sensing signal is greater than the threshold value Th1, whether the location of the sensing touch node is a boundary area is checked. In the case of the location of the sensing touch node being a boundary area, the signal is corrected to a level similar to that of a touch sensor node (e.g., internal node) outside the boundary area to calculate an accurate touch position. When the location of the sensing touch node is not a boundary area, it is checked whether the touch sensing signal is greater than a threshold value Th2 of the touch sensor node (e.g., internal node) outside the boundary area, and when the touch sensing signal is greater than the threshold value Th2, accurate touch position is calculated, and when the touch sensing signal is less than the threshold value Th2, the process of scanning the touch sensor array is started again.

Through this calibration process in software, the SNR within each area is matched, and touch sensing is performed by applying a separate threshold value at the boundary of the separated area, and additional corrections may be made for accurate position calculation so that it is possible to correct the signal so as to be continuous at the boundary between areas. Thus, the touch sensing function between areas may be effectively performed.

According to the fingerprint and touch sensor 10 according to an example embodiment, driving of the capacitive fingerprint and touch sensor may be efficiently performed on a display screen of an electronic device having a smartphone size or larger, and touch sensing may be efficiently performed in all areas of the display screen.

Figure 13:
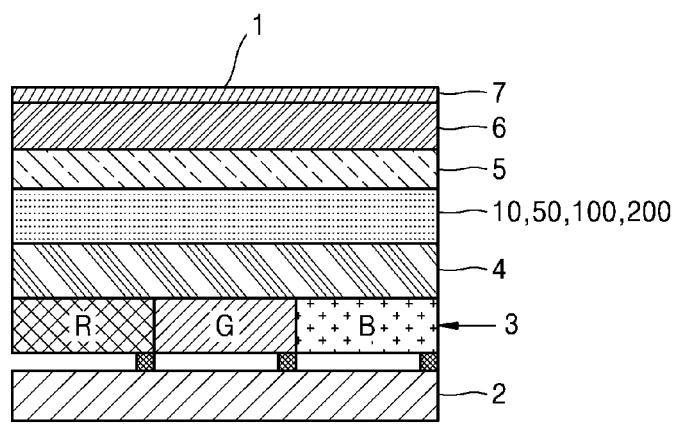
FIG. 13 schematically shows an example of an electronic device to which a fingerprint and touch sensor according to various example embodiments is applied.

FIG. 13 schematically shows an example of an electronic device to which fingerprint and touch sensors 10, 50, 100, and 200 according to various example embodiments are applied, and schematically shows an on-cell type electronic device.

Referring to FIG. 13, the on-cell type electronic device may include a display panel and a fingerprint and touch sensor.

The display panel may include a liquid crystal display (LCD) or an OLED. FIG. 13 shows an example of providing an OLED as a display panel, and the display panel may include, for example, a thin-film transistor (TFT) backplane circuit board 2, a light emission layer 3 having a sub-pixel array, and a thin film encapsulation 4 to protect the light emission layer 3.

The fingerprint and touch sensor is provided to arrange the electrode for fingerprint-touch sensing on the non-light emission area of the display panel, and the fingerprint and touch sensors 10, 50, 100, and 200 according to various example embodiments described above may be applied.

When applying an OLED as a display panel, the electrodes of the fingerprint and touch sensors 10, 50, 100, and 200 may be arranged to pass between the sub-pixel and the sub-pixel on the thin film encapsulation 4 of the OLED or between the thin film encapsulation 4 and a cover layer 7. FIG. 13 shows an example in which the fingerprint and touch sensors 10, 50, 100, and 200 are arranged on the thin film encapsulation 4 of the OLED. Furthermore, when applying the LCD as a display panel, the electrodes of the fingerprint and touch sensors 10, 50, 100, and 200 may be arranged on the black matrix area of the color filter.

In addition, an optical clear adhesive (OCA) layer 6, a cover layer 7, and the like may be provided on the fingerprint and touch sensors 10, 50, 100, and 200. For example, a foldable thin cover window glass or film may be applied to the cover layer 7. The on-cell type electronic device may further include an optical layer (such as a polarizing film) 5 to improve visibility. The optical layer 5 may be arranged, for example, between the light emission layer 3 and the OCA layer 6.

FIG. 13 shows an example in which a fingerprint and touch sensor is arranged on the thin film encapsulation 4 of an OLED. The fingerprint and touch sensors 10, 50, 100, and 200 may be arranged under the cover layer 7, for example, between the optical layer 5 and the OCA layer 6 or between the OCA layer 6 and the cover layer 7.

According to an electronic device to which various fingerprint and touch sensors 10, 50, 100, and 200 according to an example embodiment are applied, in order to enable fingerprint sensing, a high resolution display panel having a resolution of at least 250 ppi or more, for example, 500 ppi or more, may be applied as a display panel.

In addition, by making the overall thickness of the layers above the display panel thinner, for example, 350 μm or less, a foldable or flexible electronic device capable of fingerprint and touch sensing on a touch screen may be implemented, for example, a foldable phone or a flexible display.

According to various fingerprint and touch sensors and electronic devices to which they are applied according to an example embodiment, based on a structure in which a fingerprint-touch sensing area with high resolution capable of fingerprint sensing and a touch only sensing area with relatively low sensing node resolution are separated and driven, it is possible to perform both fingerprint recognition and touch sensing on the touch screen, and in the touch sensing mode, it is possible to secure a driving frequency for fingerprint sensing without losing the linearity of the touch sensing.

That is, according to the fingerprint and touch sensor according to an example embodiment, the touch sensing area where the touch only sensing is performed and the fingerprint-touch sensing area are electrically separated, and thus since the resistance and parasitic capacitance in each area may be reduced, an RC constant may be reduced, so that accordingly, a driving speed of 200 kHz or more sufficient for touch sensing, for example, a driving speed of approximately 300 kHz or more, may be achieved. Therefore, a smooth operation of the touch sensor is possible. Also, since the wiring length of the fingerprint electrodes may be reduced, a driving speed of approximately 1 MHz or more sufficient for fingerprint sensing may be achieved, thereby enabling smooth driving of the fingerprint sensor.

In addition, according to the fingerprint and touch sensor according to an example embodiment, the fingerprint recognition area may be positioned slightly inside the touch screen (e.g., display screen), from the outer edge of the display screen, and thus user convenience is enhanced. In addition, since it is configured to perform touch sensing in the entire area of the touch screen, by arranging the touch sensing nodes in the fingerprint-touch sensing area to be connected in the same period as the touch sensing nodes in the touch sensing area where touch only sensing is performed, linearity of touch sensing may be secured in the touch sensing mode.

According to a fingerprint and touch sensor and an electronic device including the same according to an example embodiment, it is possible to perform both fingerprint recognition and touch sensing and it is possible to secure a driving frequency for fingerprint sensing without losing the linearity of touch sensing in a touch sensing mode.

It should be understood that example embodiments described herein should be considered in a descriptive sense only and not for purposes of limitation. Descriptions of features or aspects within each embodiment should typically be considered as available for other similar features or aspects in other embodiments. While one or more example embodiments have been described with reference to the figures, it will be understood by those of ordinary skill in the art that various changes in form and details may be made therein without departing from the spirit and scope as defined by the following claims.

What is claimed is:

1. A sensor for recognizing a fingerprint and sensing a touch, the sensor comprising:
   a touch sensing area in which a first touch electrode and a second touch electrode are arranged to provide touch sensing nodes at which touch sensing is performed; and
   a fingerprint-touch sensing area comprising:
      a fingerprint recognition area in which a first fingerprint electrode and a second fingerprint electrode are arranged and electrically separated from the first touch electrode and the second touch electrode, the first fingerprint electrode and the second fingerprint electrode being configured to provide fingerprint sensing nodes at which a fingerprint is recognized in a fingerprint recognition mode; and
      a wiring area in which the first fingerprint electrode and the second fingerprint electrode extend for wiring,
   wherein in the fingerprint recognition area, a portion of each of the first fingerprint electrode and the second fingerprint electrode is used for fingerprint recognition and, as the touch sensing nodes, the touch sensing, and
   wherein in the wiring area, an extension portion of each of the first fingerprint electrode and the second fingerprint electrode is used for the touch sensing, and
   wherein the fingerprint-touch sensing area is spatially separated from the touch sensing area.

2. The sensor of claim 1, wherein an interval between the touch sensing nodes in the fingerprint recognition area and the wiring area is greater than an interval between the fingerprint sensing nodes in the fingerprint recognition area.

3. The sensor of claim 2, wherein the interval between the touch sensing nodes is constant in the touch sensing area, the fingerprint recognition area, and the wiring area.

4. The sensor of claim 1, wherein an interval between the touch sensing nodes in the fingerprint recognition area is greater than an interval between the fingerprint sensing nodes in the fingerprint recognition area.

5. The sensor of claim 4, wherein an interval between the touch sensing nodes is constant in the touch sensing area and the fingerprint recognition area.

6. The sensor of claim 1, wherein the first touch electrode comprises a plurality of first touch electrodes arranged in parallel in a first direction, and
   wherein the second touch electrode comprises a plurality of second touch electrodes arranged in a parallel in a second direction, the second touch electrode intersecting the first touch electrode.

7. The sensor of claim 1, wherein each of the first touch electrode and the second touch electrode comprises a plurality of polygonal pattern parts and at least one connection part between the plurality of polygonal pattern parts, or
   wherein at least one of the first touch electrode or the second touch electrode comprises an electrode line.

8. The sensor of claim 1, wherein at least one of the first touch electrode or the second touch electrode comprises a plurality of polygonal pattern parts and at least one connection part between the plurality of polygonal pattern parts, and
   wherein at least a portion of the plurality of polygonal pattern parts has a structure in which a metal mesh is formed.

9. The sensor of claim 1, wherein at least a portion of the first touch electrode and at least a portion of the second touch electrode are located at different levels, and an insulating layer is formed between the at least a portion of the first touch electrode and the at least a portion of the second touch electrode, or
   wherein the first and second touch electrodes are located at the same level, and are located at different levels at an intersection, and an insulating layer is formed therebetween.

10. An electronic device comprising:
    a display panel; and
    a sensor for recognizing a fingerprint and a touch integrated on the display panel, the sensor comprising:
       a touch sensing area in which a first touch electrode and a second touch electrode are arranged to provide touch sensing nodes at which touch sensing is performed; and
       a fingerprint-touch sensing area comprising:
          a fingerprint recognition area in which a first fingerprint electrode and a second fingerprint electrode are arranged and electrically separated from the first touch electrode and the second touch electrode, the first fingerprint electrode and the second fingerprint electrode being configured to provide fingerprint sensing nodes at which a fingerprint is recognized in a fingerprint recognition mode; and
          a wiring area in which the first fingerprint electrode and the second fingerprint electrode extend for wiring,
       wherein in the fingerprint recognition area, a portion of each of the first fingerprint electrode and the second fingerprint electrode is used for fingerprint recognition and, as the touch sensing nodes, the touch sensing,
       wherein in the wiring area, an extension portion of each of the first fingerprint electrode and the second fingerprint electrode is used for the touch sensing, and
       wherein the fingerprint-touch sensing area is spatially separated from the touch sensing area.

11. The electronic device of claim 10, wherein the electronic device comprises any one or more of a smart phone, a foldable phone, a tablet personal computer (PC), and a touch screen device.

12. The electronic device of claim 11, wherein at least one of the first touch electrode or the second touch electrode comprises a plurality of polygonal pattern parts and at least one connection part between the plurality of polygonal pattern parts,
    wherein at least a portion of the plurality of polygonal pattern parts has a structure in which a metal mesh is formed, and
    wherein the metal mesh is formed to correspond to a boundary between sub-pixels of the display panel, and openings of the metal mesh correspond to light emission areas of the sub-pixels.

13. The electronic device of claim 10, wherein the sensor is disposed on the display panel.

14. The electronic device of claim 10, wherein the fingerprint-touch sensing area is located on a side portion of the display panel.

15. The sensor of claim 14, wherein the fingerprint-touch sensing area is located in a middle of the side portion of the display panel.

16. The electronic device of claim 14, wherein the fingerprint-touch sensing area is provided on a lower side portion of the display panel, and
   wherein the fingerprint recognition area is spaced apart from an outer edge of the display panel.

17. The electronic device of claim 16, wherein the fingerprint-touch sensing area has a triangular shape, and
   wherein the fingerprint recognition area has a rhombus shape on an upper portion the fingerprint-touch sensing area.

18. The electronic device of claim 14, wherein the fingerprint-touch sensing area is located in a corner portion of the display panel.

19. The electronic device of claim 18, wherein the fingerprint recognition area is spaced apart from an outer edge of the display panel.

* * * * *